United States Patent [19]

Fujimori et al.

[11] Patent Number: 5,046,109
[45] Date of Patent: Sep. 3, 1991

[54] PATTERN INSPECTION APPARATUS

[75] Inventors: Yoshihiko Fujimori; Keiichi Hirose, both of Tokyo, Japan

[73] Assignee: Nikon Corporation, Tokyo, Japan

[21] Appl. No.: 473,103

[22] Filed: Feb. 1, 1990

Related U.S. Application Data

[63] Continuation of Ser. No. 342,657, Apr. 19, 1989, abandoned, which is a continuation of Ser. No. 186,668, Apr. 20, 1988, abandoned, which is a continuation of Ser. No. 23,850, Mar. 9, 1987, abandoned.

[30] Foreign Application Priority Data

| Mar. 12, 1986 | [JP] | Japan | 61-54489 |
| May 16, 1986 | [JP] | Japan | 61-112272 |
| May 23, 1986 | [JP] | Japan | 61-118833 |
| May 29, 1986 | [JP] | Japan | 61-123985 |

[51] Int. Cl.$^5$ .................................... G06K 9/00
[52] U.S. Cl. ........................... 382/8; 382/30; 382/41
[58] Field of Search ............... 382/8, 22, 26, 30, 41; 358/101, 106

[56] References Cited

U.S. PATENT DOCUMENTS

| 4,223,387 | 9/1980 | Danielsson | 382/8 |
| 4,334,241 | 6/1982 | Kashioka | 382/8 |
| 4,392,120 | 7/1983 | Mita | 382/22 |
| 4,445,137 | 4/1984 | Panofsky | 382/41 |
| 4,479,145 | 10/1984 | Azuma | 382/8 |
| 4,547,895 | 10/1985 | Mita et al. | 382/41 |
| 4,589,139 | 5/1986 | Hada et al. | 382/8 |
| 4,589,140 | 5/1986 | Bishop | 382/8 |
| 4,628,531 | 12/1986 | Okamoto | 382/8 |
| 4,648,053 | 3/1987 | Fridge | 382/30 |

Primary Examiner—David K. Moore
Assistant Examiner—Jose L. Couso
Attorney, Agent, or Firm—Shapiro and Shapiro

[57] ABSTRACT

An apparatus for inspecting a pattern formed on an object such as a mask or a reticle in accordance with design data includes a character extraction circuit that employs a multiplicity of templates for detecting any of a plurality of different types of bends of an edge of the pattern with respect to a reference edge, for any of a plurality of rotation angles of the reference edge. Although a large number of templates is employed, template outputs are sorted into a small number of groups, and a comparison is made between synthesized template outputs for data representing an image of a pattern region on the object and for corresponding reference data. The apparatus also includes a direct comparison circuit for comparing image data and reference data to detect defects in the pattern and to determine the size of any defect along different directions (ignoring size along an edge of the pattern). The direct comparison circuit also determines the maximum size of the defect along the different directions. A dead band is provided about the edge of the pattern to reduce the detection of a false defect by the direct comparison circuit. However, the character extraction circuit is capable of detecting any defect throughout the pattern.

9 Claims, 31 Drawing Sheets

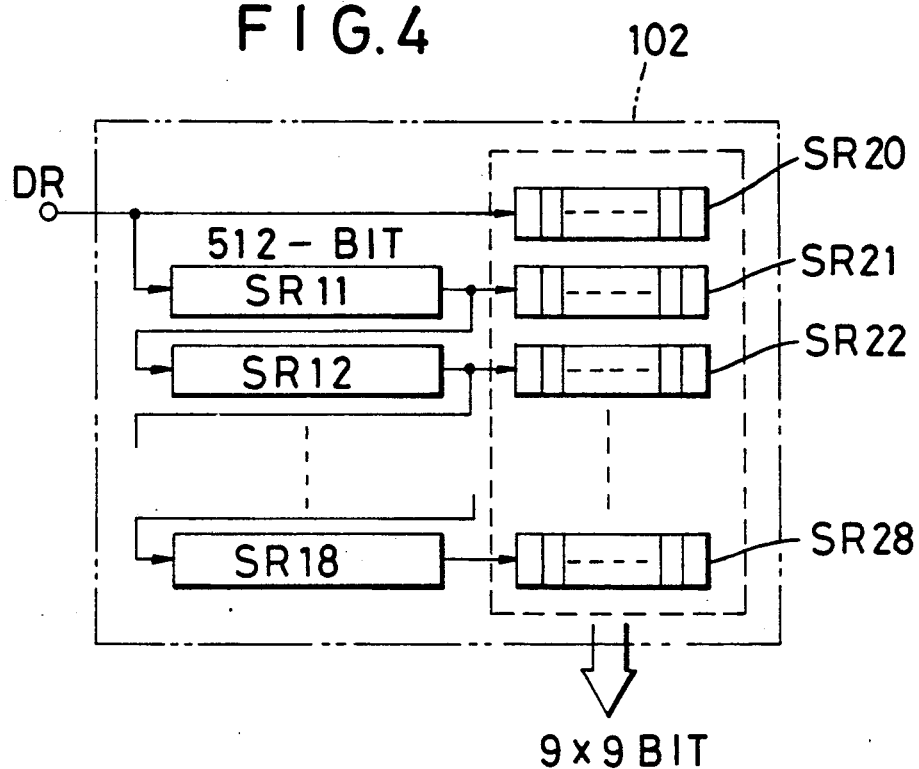

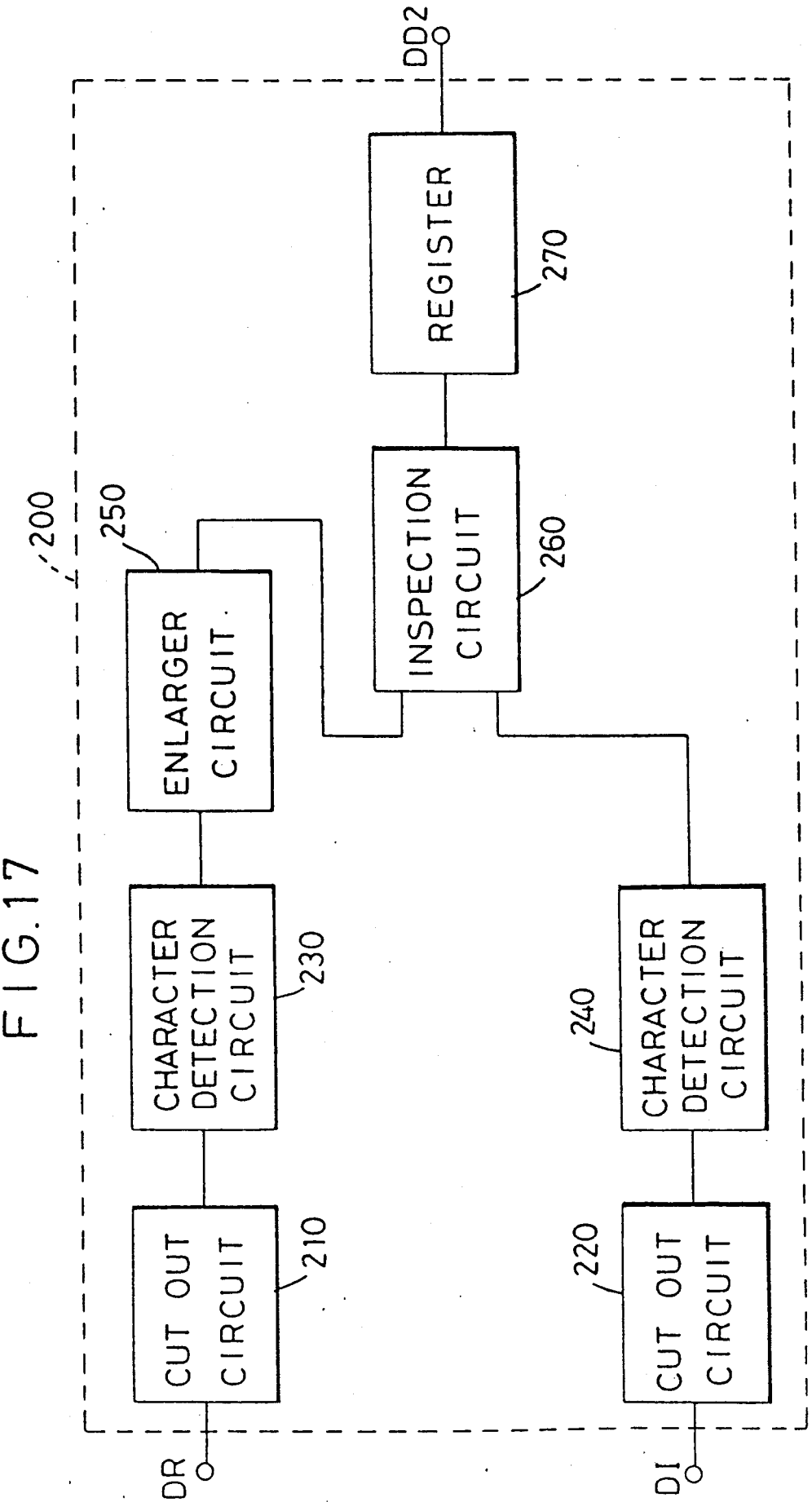

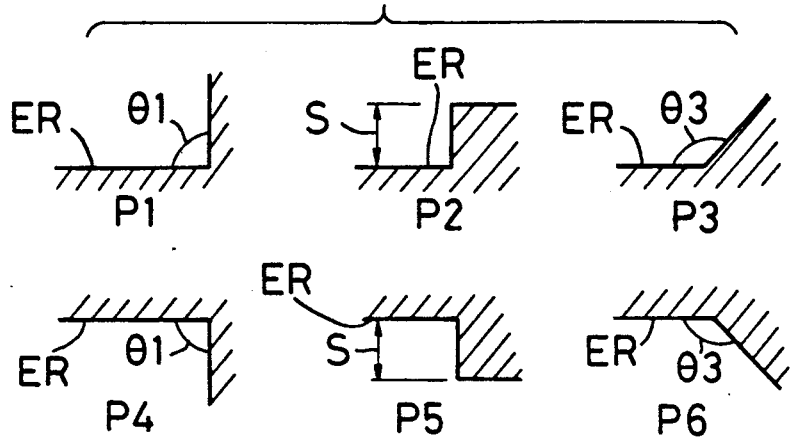

FIG.48

| | REAL PATTERN | DI | DR | DESIGN PATTERN | |
|---|---|---|---|---|---|
| A | | | NONE | | DEFECT |
| B | | | | | NORMAL |
| C | | | | | DEFECT |
| D | | | | | DEFECT |
| E | | | | | NORMAL |
| F | | | | | DEFECT |

|   | 1 | 2 | 3 | 4 | 5 |
|---|---|---|---|---|---|
| A |   |   |   |   |   |
| B |   |   |   |   |   |
| C |   |   |   |   |   |
| D |   |   |   |   |   |
| E |   |   |   |   |   |

|   | 1 | 2 | 3 |
|---|---|---|---|
| A |   |   |   |
| B |   |   |   |
| C |   |   |   |

PATTERN INSPECTION APPARATUS

This is a continuation of application Ser. No. 342,657 filed Apr. 19, 1989, which is a continuation of application Ser. No. 186,668 filed Apr. 20, 1988, which is a continuation of application Ser. No. 023,850 filed Mar. 9, 1987, all of which are now abandoned.

BACKGROUND OF THE INVENTION

Field of the Invention

The present invention relates to an inspection apparatus which makes use of a pattern recognition technique. More particularly, the present invention is concerned with an apparatus which picks up image of an object having a geometric pattern constituted by dark and bright portions formed in accordance with a design data, e.g., a mask or reticle used in the production of semiconductor integrated circuits, and which detects any defect in the pattern by comparing data corresponding to the image with the design data.

2. Related Background Art

An apparatus of the kind described above is disclosed in the specification of U. S. Pat. No. 4,589,139. In this known apparatus, characteristics of pattern edges are extracted both from the image data and the design data and the real pattern on the object is judged to be defective when both data do not have common characteristics. The judgment is conducted on the basis of an assumption that the edges of the real pattern are roughly approximated by line edges which extend in x- and y-directions and line edges which extend at 45° C. to x- and y-directions, and bend edges are extracted as edge characteristics, employing a plurality of templates. The apparatus has a problem in that it may judge any defective real pattern as being acceptable or vice versa, when the real pattern has edges of random angles or directions other than those mentioned above. The current demand for higher scale of integration of semiconductor integrated circuits naturally leads to a greater number of circuit patterns of random angle or direction. This tends to impair the precision of inspection by the known apparatus.

Any defect in the pattern on a mask or a reticle is correctable by a suitable repair means. The repairing cost, however, is increased in proportion to the number and the sizes of the defects. The defect data obtained through the known inspection apparatus includes only edge characteristics. Thus, it has been impossible to know the sizes of the defects, although the number of the defects is detectable. In consequence, there has been no way for precisely estimating the cost required for the repair.

SUMMARY OF THE INVENTION

Accordingly, a primary object of the present invention is to provide a pattern inspection apparatus which is capable of performing a high degree of precision of defect detection by comparing the real pattern with the design data on as many characteristic points as possible.

Another object of the present invention is to provide a pattern inspection apparatus in which any bends on linear pattern edges extending in random directions are detected with a high degree of precision and the thus obtained characteristics are edited into a small number of data, thus enabling the scale of the comparing inspection circuit to be decreased.

Still another object of the present invention is to provide a pattern defect inspection apparatus which is capable of detecting the sizes of defects in the pattern.

BRIEF DESCRIPTION OF THE DRAWINGS

FIG. 4 is a circuit diagram of a cut-out circuit;

FIG. 5 is a schematic illustration of a 9×9 bit window;

Figures 6, 7, 8, 9:
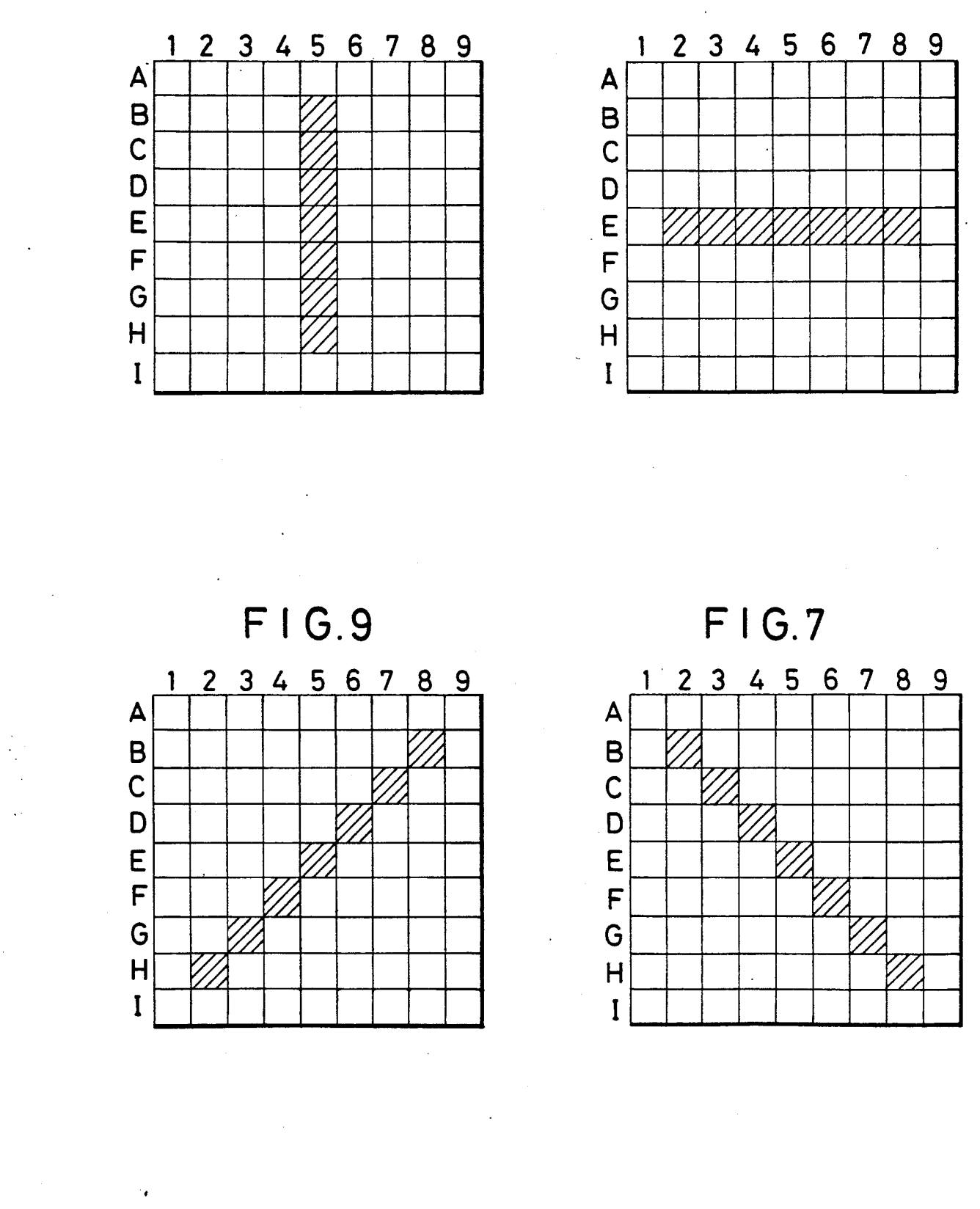

FIGS. 6 to 9 are schematic illustrations of a coordinate system which is used in the measurement of a size;

FIG. 17 is a block diagram of a characteristics extraction circuit;

FIG. 18 is an illustration of the basic form of extracted pattern characteristic;

FIGS. 19 to 37 are illustrations of arrangement of pixels showing templates used for detection of patter characteristics;

FIG. 48 is an illustration of an example of characteristic detecting operation;

DESCRIPTION OF THE PREFERRED EMBODIMENTS

Figure 1:
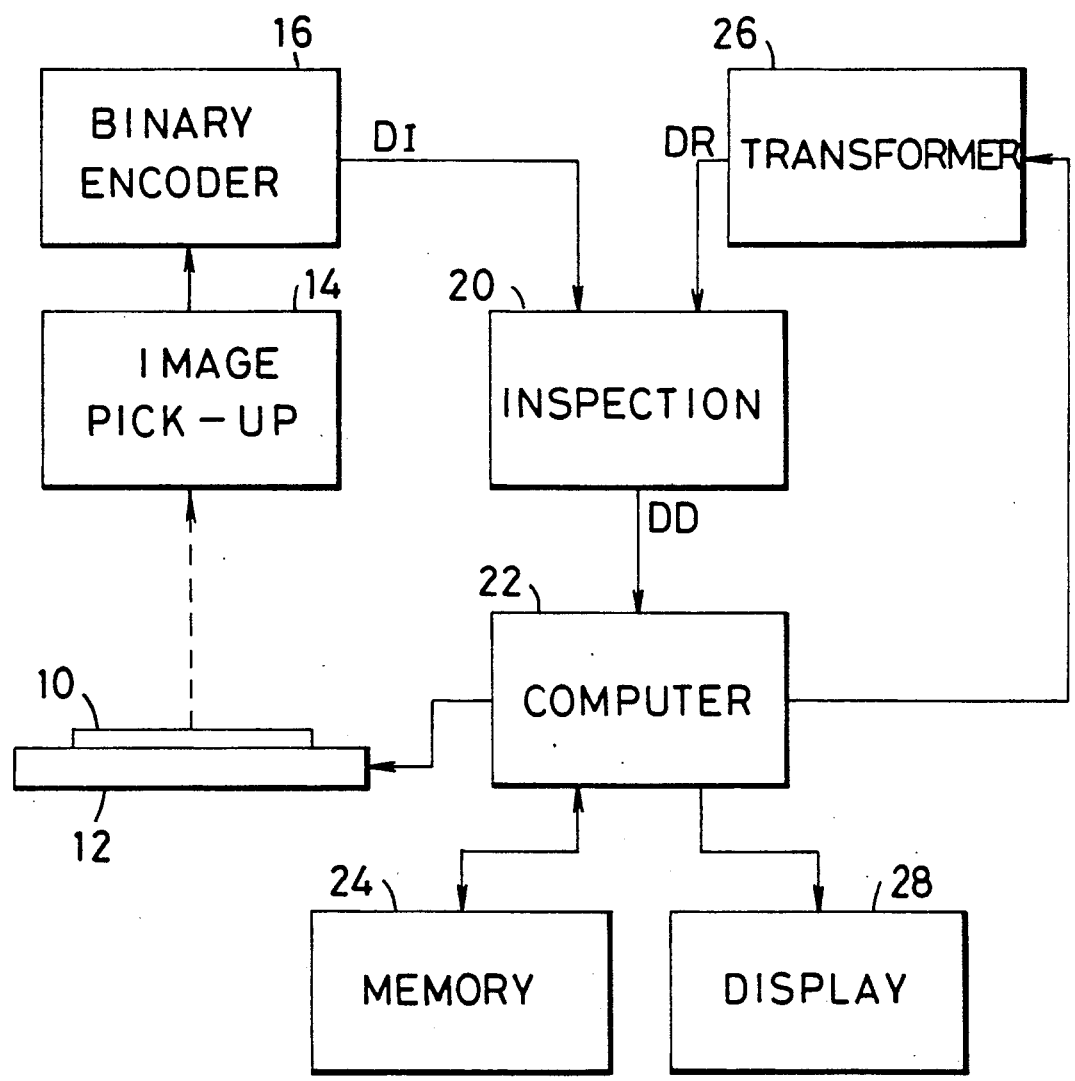
FIG. 1 is a block diagram of the whole of a pattern inspection apparatus embodying the present invention.

FIG. 1 shows the whole of a pattern inspection apparatus embodying the present invention. An inspection object 10 such as a mask or a reticle, having a real pattern formed in accordance with a design data, is placed on a moving stage 12. The image of a pattern within a small region of the real pattern is picked-up by an image pick-up device 14 including a uni-dimensional image pick-up element. This image is obtained by read-scanning achieved by the movement of the stage in the x-direction and the movement of the image pick-up device in the y-direction. The analog data derived from the image pick-up device 14 is output to a binary coding circuit 16 which is adapted to perform 512 cycles of sampling of the analog data for each line of scanning of the image pick-up device 14, and conducts binary-coding of the sampled analog data, thus obtaining binary image data DI. The image data DI is time-sequential data composed of data units each including $512 \times N$ pieces of pixels (bits). N represents a value which varies depending on the moving distance of the movable stage or the interval of scanning by the image pick-up device. Each bit takes either a logical value "1" (portion where pattern is formed by chromium) or a logical value "0" (portion where no pattern is formed). The image data DI is output to the inspection circuit 20.

A computer 22 is adapted for reading, from an external memory device, reference data corresponding to a small region of the real pattern image picked-up by the image pick-up device 14, and delivers this data to a pattern modifying circuit (transformer) 26. The pattern modifying circuit 26 is adapted for processing the reference data from the computer 22 such as to enlarge or contract the reference pattern represented by the reference data, and sends the processed reference data DR to inspection circuit 20.

The inspection circuit 20 is adapted for comparing the image data DI and the reference data DR which are delivered thereto in a time-sequential synchronized manner. If there is any difference between both data indicative of any defect in the real pattern, the inspection circuit 20 delivers defect data DD to the computer 22. The computer 22 then operates so as to store the data DD in the memory device 24 and to display the defect data on the display device 28.

The computer 22 then conducts control of various parts with regard to defect detection.

Figure 2:
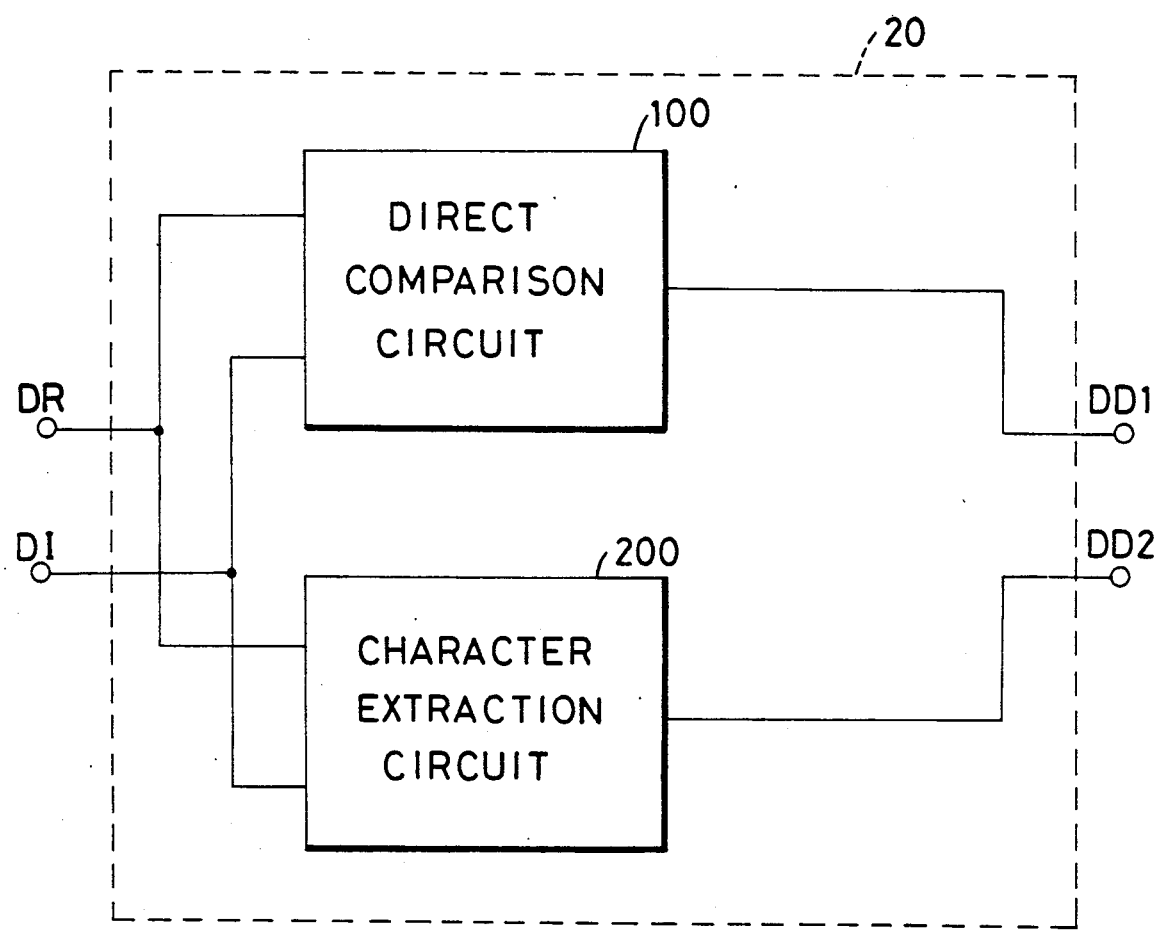
FIG. 2 is a block diagram schematically showing an inspection circuit.

FIG. 2 shows the construction of the inspection circuit 20. The inspection circuit 20 is composed of a direct comparison circuit 100 and a characteristics extraction circuit 200. Both the direct comparison circuit 100 and the characteristics extraction circuit 200 are adapted for receiving both the reference data DR from the modification circuit 26 and the data DI from the binary-coding circuit 16 and for comparing these data in different methods so as to conduct inspection for detection of the defect. As a result, these circuits 100 and 200 produce first defect data DD1 and second defect data DD2 and deliver them to the computer 22. The computer 22 then edits both defect data and stores the same in the memory device, while displaying it on the display device 28.

Figure 3:
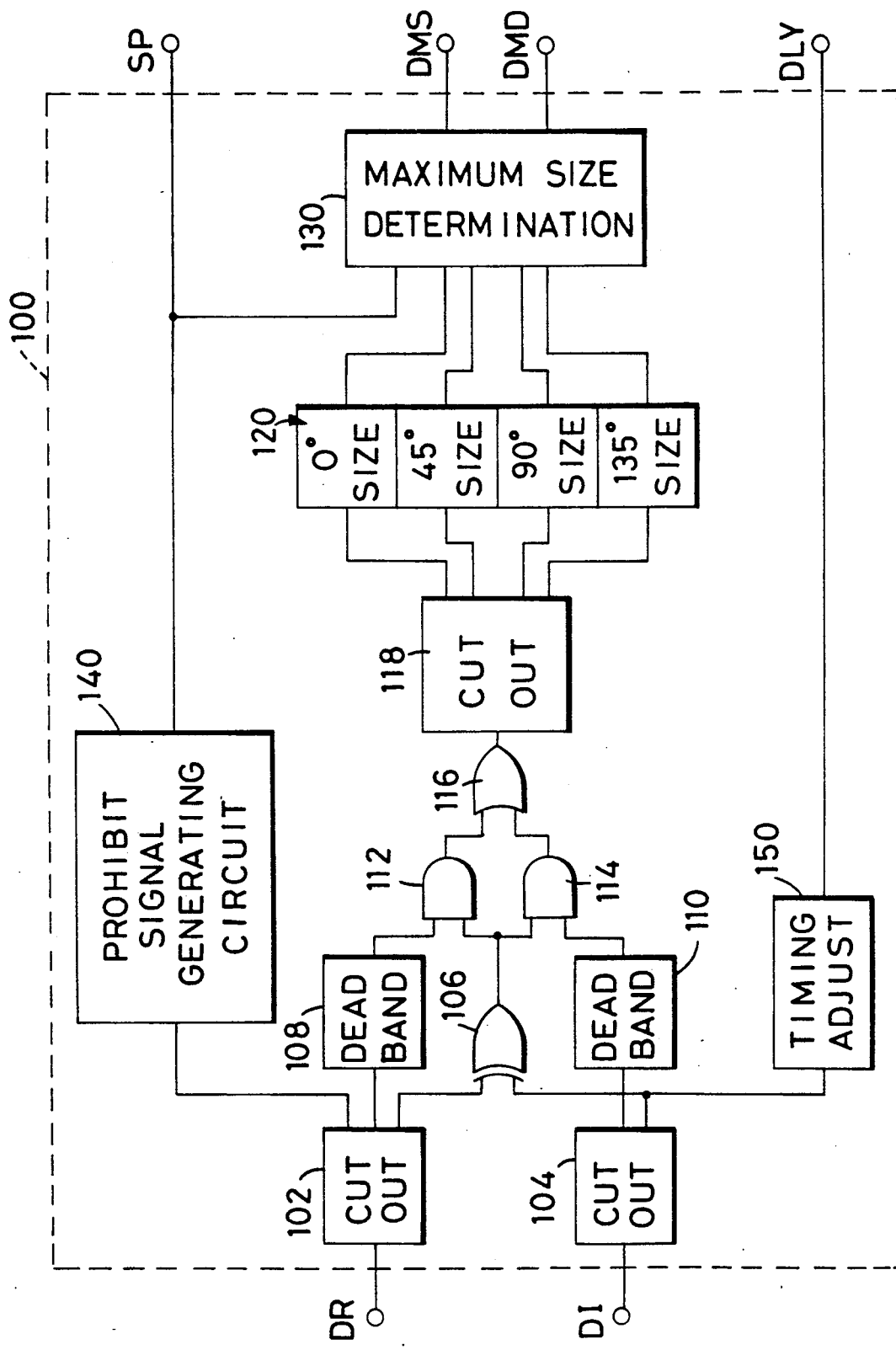
FIG. 3 is a block diagram showing the construction of a direct comparison circuit.

FIG. 3 shows details of the direct comparison circuit 100. The reference data DR and the image data DI which are time-sequentially delivered to the direct comparison circuit 100 are input to cut-out circuits 102 and 104, respectively.

As will be seen from FIG. 4, the cut-out circuit 102 is composed of shift registers SR11, SR12, ..., SR18 of 512-bit serial input/output type, and shift registers SR20, SR21, SR22, ..., SR28 of 9-bit serial input-parallel output type.

The input terminal of the shift register SR11 is adapted for receiving the reference data DR, so that the reference data is developed into $512 \times 8$ bits (pixels) in the shift register SR11 to SR18. Since each line of scan performed by the image pick-up device 14 contains 512 bits the shift registers SR11 to SR18 contain reference data which is delayed by one scanning line.

The input terminal of the shift register SR20 receives the reference data DR, while the input terminals of the shift registers SR21 to SR28 are connected to the output terminals of the shift registers SR11 to SR28. Therefore, in the shift registers SR20 to SR28, the reference data is developed into $9 \times 9$ bits.

The cut-out circuit 104 has a construction which is identical to that of the cut-out circuit 102 except that it receives the image data DI from the binary-coded circuit 16.

Thus, the cut-out circuits 102 and 104 cut out a window of $9 \times 9$ bits from the image data. In this window, the reference data DR and the image data DI input to the central one bit are delivered to respective input terminals of an EXCLUSIVE OR circuit 106. The EXCLUSIVE OR circuit is adapted for outputting a logical value "1" when both data do not accord with each other, i.e., when the real pattern is defective. However, when both data accord with each other, the EXCLUSIVE OR circuit 106 produces a logical value "0".

FIG. 5 schematically shows the construction of the $9 \times 9$ bit window. Amongst the reference data DR and the image data DI cut out by the $9 \times 9$ bit window, the data DR and DI received by 69 (sixty nine) pixels represented by ① to ④ are delivered to insensitive zone forming circuits 108 and 110, respectively. Both insensitive zone forming circuits 108 and 110 include a plurality of PLDs (Programmable Logic Devices). Each insensitive zone forming circuit is adapted for producing the following outputs according to the condition. Namely, when all the data received by the pixels represented by ① are "1" or "0", it produces a first output which is a logical value "1". When all the data received by the pixels represented by ① and ② are "1" or "0", it produces a second output which is a logical value "1". When all the data received by the pixels represented by ①, ② and ③ are "1" or "0", it produces a third output which is a logical value "1". When all the data received by the pixels represented by ①, ②, ③ and ④ are "1" or "0", it produces a fourth output which is a logical value "1".

The insensitive zone forming circuits 108 and 110 are adapted for selectively outputting one of the first, second, third and the fourth outputs in response to a data select signal (not shown) derived from the computer 22.

An AND circuit 112 is adapted for receiving both the outputs from the insensitive zone forming circuit 108 and the EXCLUSIVE OR circuit 106, while an AND circuit 114 is adapted for receiving the outputs from the insensitive zone forming circuit 110 and the EXCLUSIVE OR circuit 106.

These insensitive zone forming circuits 108, 110 and the AND circuits 112, 114 are used to eliminate any false defect detection. Namely, in the region near the pattern edge, concavities and convexities are inevitably formed in the area near the pattern edge when the image data of the pattern is binary coded, due to binary coding error (quantizing error), and such concavities and convexities are often judged as being defects. It is also to be noted that erroneous judgment may be effected due to synchronization offset between the reference data and the image data. Any characteristics which are found to be defects as a result of the erroneous judgment are generally referred to as false defects. In the described embodiment, any false defect detection is avoided by the provision of the above-mentioned circuits 108, 109, 112 and 114. When the first output is selected by the data selector, an insensitive zone corresponding to a pixel is formed on each side of the edge. When the second output is selected by the data selector, an insensitive zone corresponding to two pixels is formed on each side of the edge. When the third output is selected by the data selector, an insensitive zone corresponding to three pixels is formed on each side of the edge. Finally, when the fourth output is selected by the data selector, an insensitive zone corresponding to four pixels is formed on each side of the edge. The size of the insensitive zone is determined taking into account the size of the false defect which in turn is known beforehand by the extent to which the binary-coding error or the synchronism offset is allowed. The outputs from AND circuits 112 and 114 are connected to respective input terminals of the OR circuit 116.

The output from the OR circuit 116 is delivered to the cut out circuit 118. The cut out circuit 118 has the same construction as the cut out circuits 102 and 104. A portion of the data developed in the serial input/parallel output type shift registers of 9×9 pixels is input to a size detection circuit 120.

The size discrimination circuit 120 measures the size of the defect in the directions of 0°, 45°, 90° and 135°. In order to measure the size in the directions of 0°, 45°, 90° and 135°, the data on seven pixels hatched in FIGS. 6, 7, 8 and 9 are used. The size detection circuit 120 outputs the result of measurement of the size in each measuring direction.

A maximum size judging circuit 130 is adapted for discriminating the biggest one from the sizes measured in the directions mentioned above, and outputs data concerning the maximum size and direction.

Figure 10:
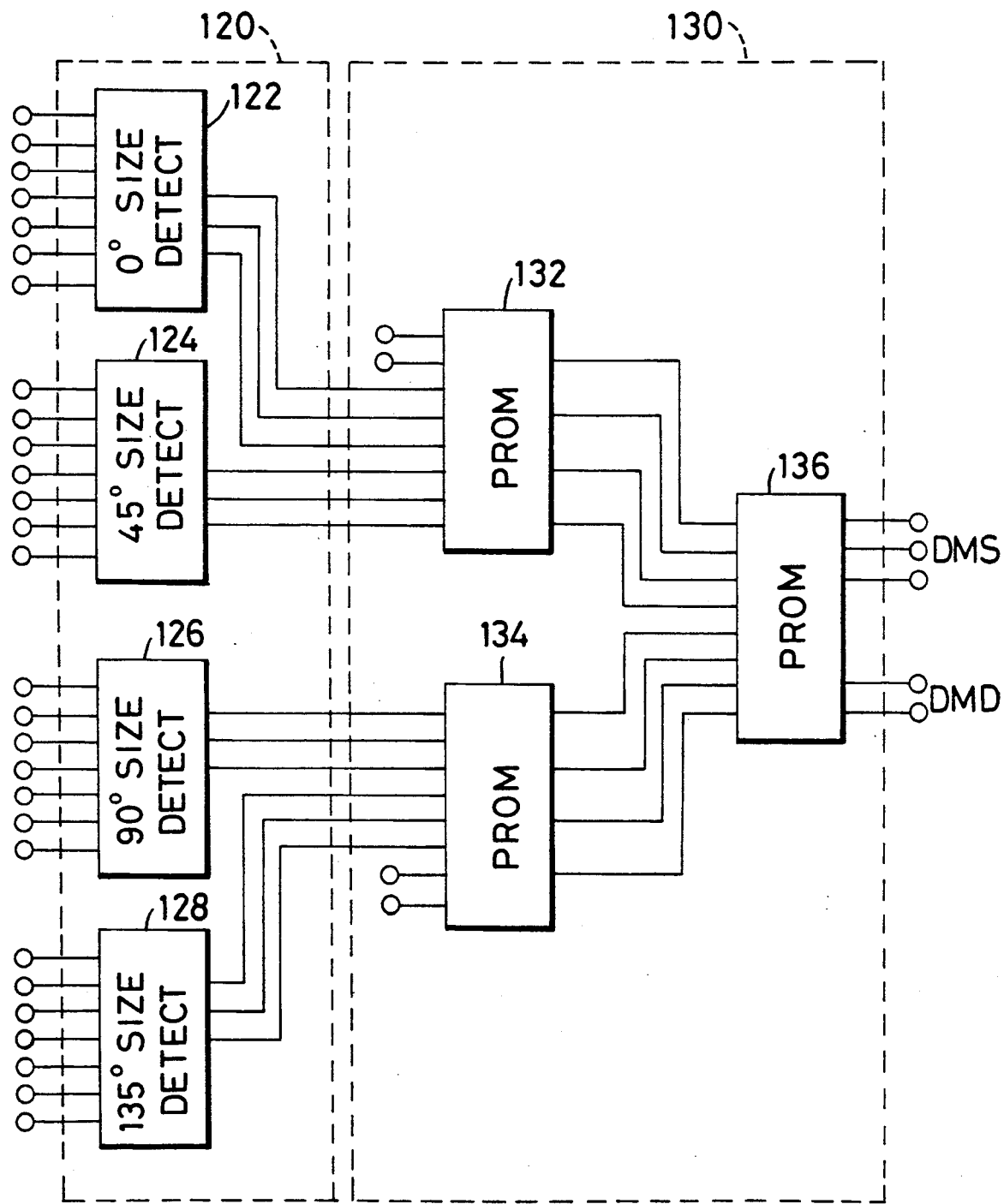
FIG. 10 is a block diagram of a size detection circuit and a maximum size discrimination circuit.

FIG. 10 shows the construction of the size detection circuit 120 and the maximum size judging circuit 130.

Referring to this FIG., size detection circuits 122, 124, 126 and 128 intended for measurement of the defect size in the directions of 0°, 45°, 90° and 135° are constituted by PLDs (Programmable Logic Devices). Each of these size detection circuits is adapted to receive 7-bit parallel input and to produce 3-bit parallel output. An explanation will be given hereinafter as to the detection circuit 122 for detecting the defect size in the direction of 0°. The circuit 122 is adapted for receiving 7-bit data from seven pixels shown in FIG. 7, out of the 9×9 bit window defined by the cut out circuit 118. For instance, assuming here that the data from the pixels given by coordinates (4,E), (5,E) and (6,E) are "1" while the data from other pixels are "0", the detection circuit 122 delivers 3-bit data which represents that the size of the defect measured in this direction is 3 in terms of the number of the pixels. Each size detection circuit is capable of producing eight types of output, namely, seven types of output which respectively represent that the defect size is 0 to 6 and an output which represents that the defect size is 7 or greater in terms of the number of pixels.

The maximum size judging circuit 130 is constituted by three PROMs (Programmable Read Only Memory) 132, 134 and 136. The PROM 132 receives, through 8 address lines, size data of 6 bits in total from the size detection circuits for detecting the defect size in 0° and 45° direction, and a 2-bit detection prohibition signal from a later-mentioned prohibition signal generating circuit 140. The PROM 132 then outputs the size data concerning the greater size data through three data lines. However, when the size detection is prohibited by a prohibition signal for one of the size data, the PROM 132 delivers the other size data from the data line. The PROM 132 also delivers an output as to which one of the size data has been delivered, through a single data line.

The PROM 134 receives size data of 6 bits in total from the size detection circuits for detecting the defect size in 90° and 135° directions, and a 2-bit detection prohibition signal from the prohibition signal generating circuit 140. The PROM 134 then outputs the size data concerning the greater size data through three data lines. However, when the size detection is prohibited by a prohibition signal for one of the size data, the PROM 132 delivers the other size data from the data line. The PROM 132 also delivers an output as to which one of the size data has been delivered, through a single data line. The PROM 136 receives the 8-bit parallel outputs from the PROMs 132 and 134, and delivers the maximum size data DMS concerning the greater size to the computer 22 through three data lines, and also delivers to the computer 22 a direction data DMD concerning to which direction the maximum size data DMS pertains. Each of the PROMs 132, 134 and 136 is designed such that when the sizes represented by two size data received by it are the same it selects and outputs one of these data.

Figure 11:
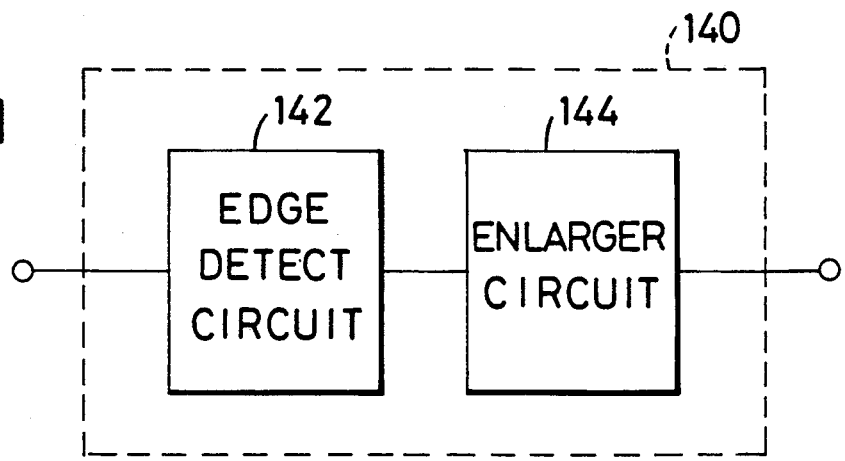
FIG. 11 is a block diagram of a prohibition signal generating circuit.

As will be seen from FIG. 11, the prohibition signal generating circuit 140 is composed of an edge detection circuit 142 and an enlarging circuit 144.

Figure 12:
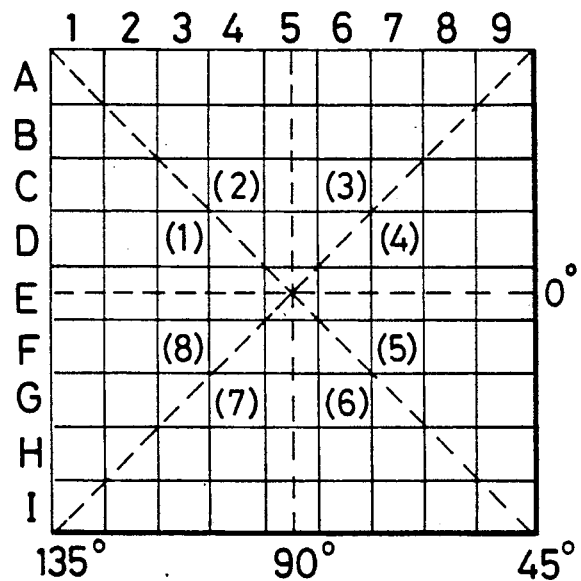
FIG. 12 is a schematic illustration of a coordinate system which is used in edge detection.

The edge detection circuit 142 receives, from the cut out circuit 102, pixel data of 8 coordinate values indicated by (1)- to (8) in FIG. 12. Upon receipt of these data, the edge detection circuit detects presence or absence of any edge and also the direction of the edge, and outputs data concerning the presence or absence, as well as the direction, of any edge.

For instance, the edge detection circuit 142 judges that the reference data DR represents an edge of 0° when all the data of four bits (1) to (4) are logical "1" while all the data of four bits (5) to (8) are logical "0", or vice versa. Similarly, the edge detection circuit 142 judges that the reference data DR represents an edge of 135° when all the data of four bits (8) and (1) to (3) are logical "1" while all the data of four bits (4) to (7) are logical "0", or vice versa. The 4-bit edge detection data corresponding to the directions of 0°, 45°, 90° and 135° are delivered to the enlarging circuit 144.

The enlarging circuit 144 has four circuit units. As will be seen from FIG. 13, each circuit unit has four serial input/serial output shift registers SR31 to SR34 having 512 bits, a 4-bit serial input/parallel output shift register SR40 and two OR circuits. The input terminal of the shift register SR31 receives one bit out of the 4-bit edge detection data, so that the reference data DR is developed into 512×4 bits (pixels) in the shift registers SR31 to SR34. Thus, the shift registers SR31 to SR34 store edge detection data which are delayed successively by one scanning line.

One of the OR circuits receives the output from the other OR circuit and also the output of each bit from the shift register SR40. The output from this OR circuit is enlarged such that 1-bit edge detection data is expanded into 5×5 pixels.

Figure 13:
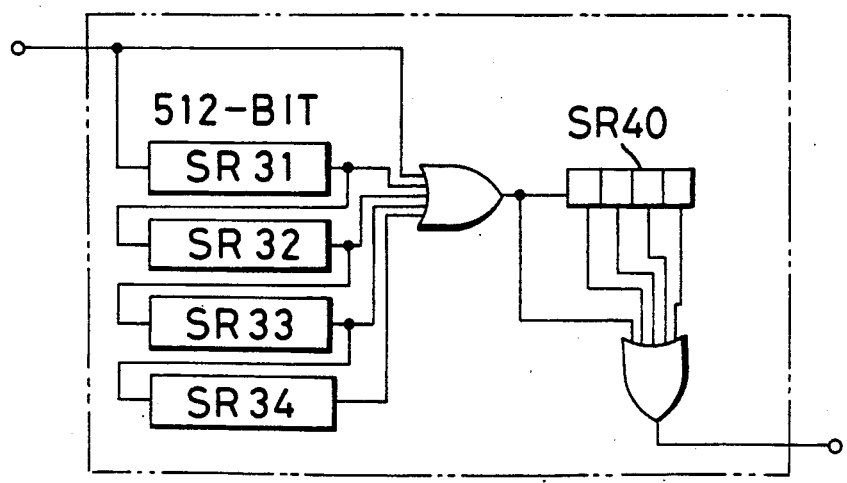
FIG. 13 is a circuit diagram of a magnifying circuit.

The enlarging circuit 144 has four circuit units shown in FIG. 13 corresponding to edge detection data obtained in four directions. Thus, the output from the enlarging circuit 144 is a 4-bit parallel output. This parallel output is divided into two data namely, 2-bit data corresponding to the edges of 0° and 45° 2-bit data corresponding to edges of 90° and 135°. These 2-bit data are respectively sent to the data lines of the PROMs 132 and 134 explained before in connection with FIG. 10, as the detection prohibition signals SP (FIG. 3). When the maximum size data DMS is delivered from the maximum size judging circuit 130, the 4-bit size detection prohibition signals SP are delivered to the computer 22, in order to suggest the direction of the edge around which the defect represented by the maximum size data DMS has been detected.

Referring now to FIG. 3, the timing adjusting circuit 150 operates, upon receipt of the pixel data of the central coordinate value (5,E) from the cut out circuit 104 which develops the image data DI, so as to delay the timing of outputting therefrom such that the output timing coincides with the timing of the output from the maximum size judging circuit 130. When the maximum size data DMS and the direction data DMD are delivered, the delayed output DLY indicates whether the defect is of the logical value "0" or "1", i.e., whether the defect is a white blank in the area where a pattern should exist or a black defect in the area where no pattern should exist. The delayed output DLY, therefore, is sent to the computer 22.

A description will be given hereinafter as to the operation of the direct comparison circuit 100.

The reference data DR and the image data DI which are delivered to the direct comparison circuit 100 in a time-sequential manner are fed to the cut out circuits 102 and 104 so as to be developed into data of 9×9 bits. Amongst the reference data and the image data of 9×9 pixels, the data received by the central pixel having coordinate value (5,E) are supplied to the EXCLUSIVE OR circuit 106. The EXCLUSIVE OR circuit produces a logical value "1" when both data do not accord with each other, i.e., when there is a defect in the real pattern, whereas, when these data accord with each other, it produces a logical value "0". The thus obtained logical values are fed to one of the inputs of both AND circuits 112 and 114.

Figure 14A:
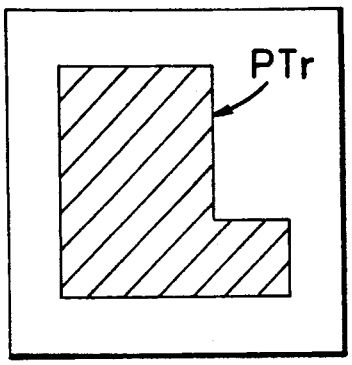
FIGS. 14A, 14B, 14C, 14D, 14E and 14F are patternized schematic illustrations of different steps of a process-performed the direct comparison circuit.
Figure 14B:
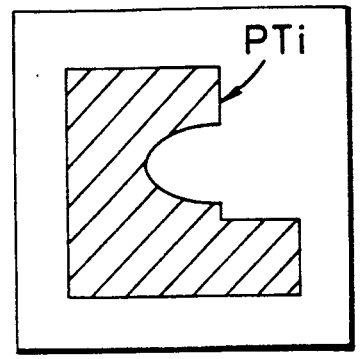

FIGS. 14A and 14B show the reference data and the image data which have been received by the inspection circuit 20 in a time-sequential manner and patternized through development into units each having 64×64 pixels. FIG. 14C shows the output from the EXCLUSIVE OR circuit developed into the same units as above. Thus, the pattern shown in FIG. 14C is a defective pattern PTdl which is obtained by superimposing a pattern PTr corresponding to the reference data shown in FIG. 14A and a pattern PTi corresponding to the image data shown in FIG. 14B, and extracting the area where both patterns do not overlap. Thus, the defective pattern PTdl corresponds to the output from the EX-CLUSIVE OR circuit 106. The reference data and the image data are cut out through the windows of 9×9 pixels, by the cut out circuits 102 and 104. Amongst these data, the reference data and the image data received by the 69 pixels indicated by numerals ① to ④ are input in a parallel manner to the insensitive zone forming circuits 108 and 110, respectively. It is assumed here that the third outputs are selected in both insensitive zone forming circuits in accordance with the data select signal derived from the computer 22. The third outputs from the insensitive zone forming circuits are of the logical level "1" which are obtained when the data on all the pixels indicated by the numerals ①, ② and ③ in FIG. 5 are "1" or "0", i.e., when no edge is detected, and which are delivered to the other input terminals of the AND circuits 112 and 114 thus making it possible to detect the defect. Thus, the area corresponding to six pixels around the edge, i.e., an area of 3 pixels on each side of the edge, is defined as an insensitive zone, so that defect detection is prohibited in the areas of 6 pixels around the edges of the reference pattern Pr and the real pattern Pi.

Figure 14D:
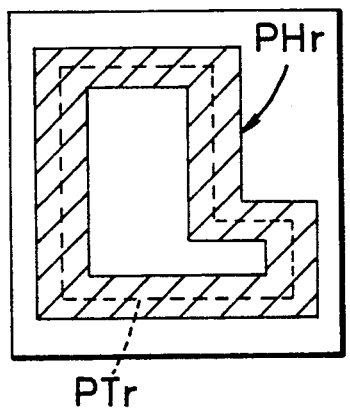
Figure 14C:
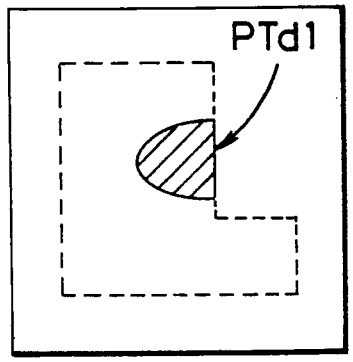
Figure 14E:
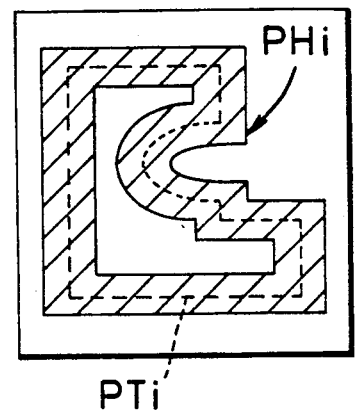
Figure 14F:
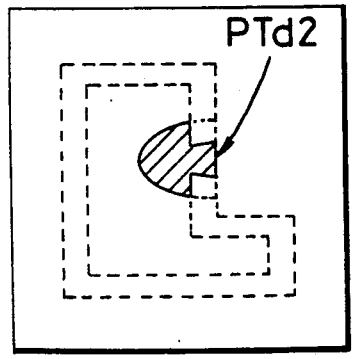

FIGS. 14D and 14E show the outputs from the insensitive zone forming circuits 108 and 110 after a patternizing processing., while FIG. 14F shows the output from the OR circuit 116 after a patternizing processing. In FIG. 14D, the hatched area represents the insensitive zone PHr which is defined so as to cover the regions on both sides of the edges of the pattern PTr. Similarly, in FIG. 14E, the hatched area represents the insensitive zone PHi which is defined so as to cover the regions on both sides of the edges of the pattern PTr.

The insensitive zone PHr shown in FIG. 14D and defective pattern PTdl shown in FIG. 14C are superposed and the area where they do not overlap is extracted. Similarly, the insensitive zone PHi shown in FIG. 14E and the defective pattern PTdl shown in FIG. 14C are superposed and the area where they do not overlap is extracted. These areas are combined so that a defect pattern PTd2 shown in FIG. 4F is formed. This pattern corresponds to the output from the OR circuit 116.

The logical circuit constituted by the AND circuits 112, 114 and the OR circuit 116 ensures a higher precision of defect detection. This logical circuit can be used effective particularly in the detection of a so called isolated defect which is positioned far from an edge and which has such a small size as to be concealed by the insensitive zone.

For instance, it is assumed here that this defective pattern is a so-called black defect which exists in an area where no pattern should exist. This defect is recognized as pattern only in the real pattern, so that it can be detected as a defective pattern from the output of the EXCLUSIVE OR circuit 106. This defective pattern is covered by the insensitive zone defined on the basis of the real pattern, and no defective pattern output is derived from the AND circuit 114. However, since this black defect does not appear in the reference pattern, this defect pattern is not covered by the insensitive zone which is defined on the basis of the reference pattern. It is, therefore, possible to obtain the output of the defective pattern from the AND circuit 112.

Conversely, when the isolated pattern is a so-called white pattern which is a blank in the area where the pattern should exist, the defect is detected from the output of the EXCLUSIVE OR circuit but no defective pattern output is derived from the AND circuit 112 because the defect pattern is covered by the insensitive zone which is formed on the basis of the reference pattern. However, since the white defect does not appear in the real pattern, the defect is not covered by the insensitive zone formed on the basis of the real pattern. It is, therefore, possible to obtain a defective pattern output from the AND circuit 114.

The output from the OR circuit 116 is developed into 9×9 pixels by the cut out circuit 118 and is delivered to the size detection circuit 120.

The size detection circuits 122, 124, 126 and 128 (FIG. 10) receive from the cut out circuit 118 the data which are hatched in FIGS. 6 to 9. It is assumed here that the size of the detected defect is greater than 7 pixels in the direction of 0°, and equals 4 pixels, 5 pixels and 4 pixels in the directions of 45°, 90° and 135°, respectively. In such a case, the PROM 132 of the maximum size judging circuit 130 receives size data corresponding to seven or more pixels from the size detection circuit 122 (0°) and a size data corresponding to four pixels from the size detection circuit 124 (45°). It is assumed here that, in the meantime, the prohibition signal generating circuit 140 produces a signal which does not prohibit the size judgment in any direction. Therefore, the PROM 132 reads the contents of designated memory cells through 4-bit data lines. The contents are set beforehand such as to indicate that the size of the defect is greater than 7 in terms of the number of the pixels and that the direction is 0°.

The PROM 134 receives size data corresponding to 5 pixels and 4 pixels and 5 pixels from the size detection circuits 126 (90°) and 128 (135°), respectively. It is assumed here that, in the meantime, the prohibition signal generating circuit 140 produces a signal which prohibits the signal detection in the direction of 90°. In consequence, the PROM 134 delivers, from the designated memory cells, data which represent that the size of the defect is 4 in terms of the number of pixels and that the direction of the defect is 135°.

The process for eliminating the defect size in the direction parallel to the pattern edge is effective particularly when the object 10 to be inspected is a mask or a reticle. Any black defect which largely projects in the direction perpendicular to an edge may contact with an adjacent pattern portion so as to cause a bridging. Similarly, any white defect having a large size in the direction perpendicular to a pattern edge may cause a breakage or cutting of a conductor wire in a circuit pattern. This means that the defect size has a greater significance in the direction perpendicular to the pattern edge than in the direction parallel to the pattern edge. Therefore, in the described embodiment, the prohibition signal generating circuit operates to put a greater importance on the defect size having a component perpendicular to a pattern edge, by ignoring the defect size parallel to the pattern edge. The PROM 136 receives, from the PROMs 132 and 134, data which indicates that the defect size is 7 or greater in terms of the number of pixels and that the direction of the defect is 0°, and delivers this data to the computer 22.

When the reference data DR represents an edge of 90°, the edge detection circuit 142 of the circuit 140 receives 8 coordinate data indicated by (1) to (8) in FIG. 12 from the cut out circuit 102. In this case the data on four bits (7), (8), (1) and (2) are all "1" while the data on four bits (3) to (6) are all "0", or vice versa. Therefore, the edge detection circuit 142 produces 4-bit parallel output in which the third bit takes a logical value "1" while other bits take logical value "0". Thus, the 4-bit edge detection data represents that there is an edge and that the direction of the edge is 90°.

The enlarging circuit 144 enlarges the 4-bit edge detection data into 5×5 pixels, and sends the thus enlarged data to the PROM 134 as a prohibition signal. In response to this prohibition signal, the PROM 134 operates to remove the size in the 90° direction from the comparison object.

Figure 15A:
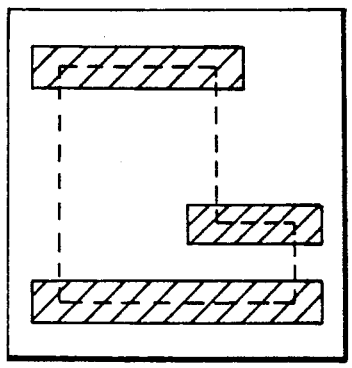
FIGS. 15A, 15B, 15C and 15D are patternized schematic illustrations of an edge detection process.
Figure 15B:
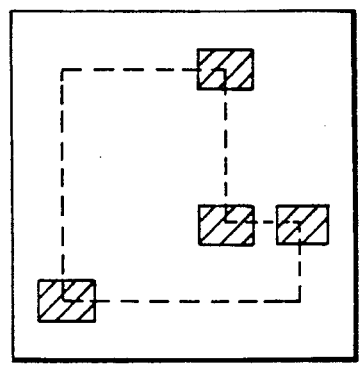
Figure 15C:
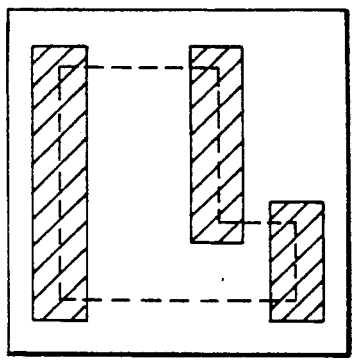
Figure 15D:
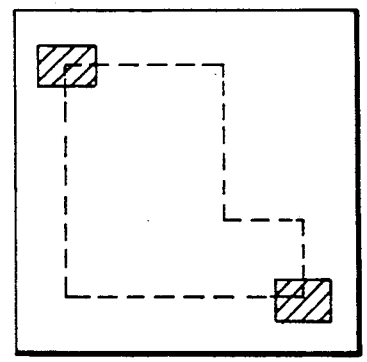

FIGS. 15A to 15D schematically show the results of edge detection conducted on the reference pattern PTr shown in FIG. 14A and the manners in which the detected edges are enlarged. More specifically, FIG. 15A shows the detection and enlargement of the edge in 0° direction. Similarly, FIGS. 15B, 15C and 15D show the result of the edge detection and enlargment of the edge in 45°, 90° and 135° direction, respectively. The judgment of the defect size is prohibited in the areas which are hatched in these FIGS.

The computer 22 conducts the following processings, upon receipt of various signals such as the defect data DD1 including the maximum size data DMS and the direction data DMD from the maximum size judging circuit 130, a prohibition signal from the enlarging circuit 144, discrimination data formed on the basis of the delayed output from the timing adjusting circuit 150, and defect data DD2 from the characteristics extraction circuit 200.

i) Maximum size data DMS are successively fed into the computer 22. The computer 22 selects, from among the sizes in each processing unit of 64×64 pixels, the maximum one as the size of the defect. To this end, the computer 22 compares, each time new size data is received, the newly received size data with old data stored in a memory and, when the newly received size data is greater than the old data, replaces the content of the memory with this newly received data. This operation is conducted for each unit of processing, and the size data finally remaining in the memory is determined as the data of the defect in this unit of processing. The computer then sends to the external memory device 24 various data such as the coordinate value of this unit of processing, size data and the direction data of this defect, white and black discrimination data obtained when the defect is detected, and the prohibition signal, thereby to store these data in the external memory device 24, or to display these data on a display device 28.

A CRT of the display device 28 has a screen or frame constituted by 512×512 pixels for displaying the reference pattern and the real pattern which are superposed to each other. Preferably, the display device 28 also is adapted for showing any defective unit of processing by a frame of a size corresponding to 64×64 pixels and indicates the type of the defect within the frame. The types of the defect are, for example, an edge defect which is in close proximity of a pattern edge and an isolated defect which is far from the pattern edge. The discrimination of the type of the defect is possible through judging whether there is any prohibition signal. Namely, when there is a prohibition signal, the defect is judged as being an edge defect, whereas, when there is no prohibition signal, the defect is judged as being an isolated defect.

ii) It is assumed here that the direct comparison circuit 100 could not detect any defect in a unit of processing, so that the first defect data DD1 is not available. In such a case, the computer 22 picks up second defect data DD2 from the characteristics extraction circuit 200 and records the same in the memory device 24 or displays the same on the CRT. Namely, the computer has an editing function which gives a priority to the first defect data and handles the first defect data as the final defect data while neglecting the second defect data, whenever the first defect data is available, whereas, when the first defect data is not available, it treats the second defect data as the final data. In order to eliminate any possibility of detection of a false defect, the defect detection is prohibited within an insensitive zone which is defined around the pattern edge. This causes a risk for the apparatus to fail to detect any defect which may exist in the area covered by the insensitive zone. This problem, however, is overcome and a high precision of detection of defect is ensured because the characteristics extraction circuit 200 is capable of detecting any defect which may exist in the whole area of the real pattern including the areas covered by the insensitive zones, although it cannot detect the size of the defect.

In another editing method, the size represented by the first defect data is examined and, when the size is smaller than a predetermined one, e.g., the size corresponding to two pixels, the second defect data is output as the final defect data.

Figure 16:
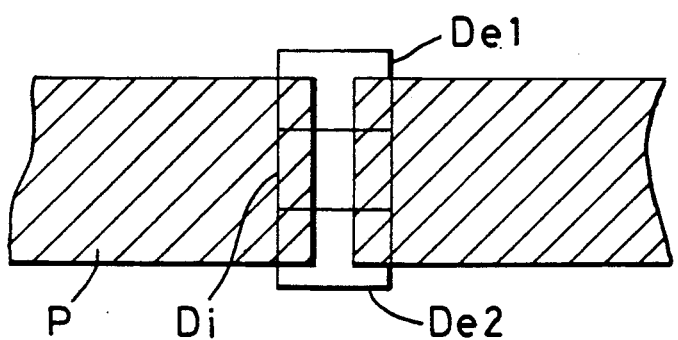
FIG. 16 is an enlarged view of a pattern defect.

The direction data concerning the defect can be used, for example, as a means of judging the type of the defect. For instance, referring to FIG. 16, a pattern P includes two edge defects and one isolated defect. The edge defects reside in regions De1 and De2, while the isolated defect resides in a region Di, and these defects are connected continuously. In such a case, when the defects are a white defect of the same direction, these defects are judged as being a breakage or cutting of a conductor wire. Conversely, when these defects are black defects, they are judged as being a bridging defect.

FIG. 17 shows an example of the characteristics extraction circuit 200. The reference data DR and the image data DI are received by the cut out circuits 210 and 220. The cut out circuits 210 and 220 have a construction which is the same as that of the circuit shown in FIG. 4 except that the number of the series-connected 512-bit counters is 14 and that 15 (fifteen) 15-bit shift registers are connected to the output of each 512-bit shift register. Therefore, the cut out circuits 210 and 220 develop the reference data and the image data in windows of 15×15 bits, respectively. The reference data developed in the window of the cut out circuit 210 are successively supplied to the characteristics detection circuit 230, while the image data developed in the window of the cut out circuit 220 are successively supplied to the characteristics detection circuit 240.

The characteristics extraction circuit 240 conducts a template matching by making use of templates which are beforehand prepared for the image data, and edits the resultant data. The result of the editing is output to an inspection circuit 260. As will be detailed later, the characteristics detection circuit 240 has more than one thousand templates and edits the detection data from these templates into six groups. In consequence, the inspection circuit 260 can receive only six types of data, each data being represented by a one bit signal. The reference data from the cut out circuit 210 also is delivered to a similar characteristics extraction circuit 230 and is edited into six types of data. The six types of data from the characteristics extraction circuit 230 are input to the enlarging circuit 250.

In general, the detection of characteristics through a pattern matching process cannot provide a high degree of precision of the defect inspection when there is a synchronizing offset greater than one pixel between the reference data and the image data or when there is an offset of position of the real pattern. In the described embodiment, therefore, the environment of the pixel which has been detected as being a characteristic on the reference data is enlarged by the same characteristics data. The enlarged data is sent to the inspection circuit 260.

The inspection circuit 260 compares the enlarged characteristics data with the characteristics data derived from the characteristics detection circuit 240, and sends the result of the comparison to the memory circuit (register) 270. The memory circuit 270 temporarily stores the result of the inspection for a small region of the image. When the inspection is completed on this small region, it delivers the result of the inspection to the computer 22, thus preparing for the inspection of the next small region.

In the arrangement of the embodiment under description, the constructions of the characteristics detection circuits, enlarging circuit and the inspection circuit are significant. The constructions of these circuits, therefore, will be described in detail hereinafter.

FIG. 18 shows six basic forms of the pattern edges detected by the characteristics detection circuit. Patterns $P_1$ and $P_4$ are acute angle corners which are inclined at a right angle or a smaller angle $\theta_1$ with respect to a horizontal reference edge ER, while patterns $P_2$ and $P_5$ are step corners which form steps of heights corresponding to a predetermined number S of pixels. Patterns $P_3$ and $P_4$ are obtuse angle corners which are bent at an angle $\theta_3$ greater than a right angle with respect to the horizontal reference edge ER.

In this embodiment, two, three and four pixels are detected as the pixel numbers S of the step corners. Therefore, two templates for the purpose of detection of the patterns having opposite step directions, e.g., the patterns $P_2$ and $P_5$, three templates for detecting the step heights corresponding to two, three and four pixels, and two templates for the detection of patterns which are black/white inverted patterns of the patterns $P_2$ and $P_5$, thus requiring 12 (2×3×2=12) templates for the purpose of detection of the steps with respect to the horizontal reference edge ER. In addition, templates are prepared by rotating each template with respect to the horizontal reference line by an amount corresponding to one pixel (about 10°) so as to obtain 36 cases (360°/10°=36) for each template, in order to enable detection with respect to reference edges of any angle. In consequence, 432 (12×36=432) templates are prepared for the purpose of detection of the step corners. In regard to the obtuse angle corners such as the patterns $P_3$ and $P_6$, it is possible to form the necessary templates in a manner very similar to the preparation of the templates for the detection of the patterns $P_2$ and $P_5$. In order to adapt to various obtuse angles $\theta_3$, 432 templates are prepared for the purpose of obtuse angle corners such as the patterns $P_3$ and $P_6$, including rotation of the reference edge ER at an interval corresponding to one pixel (about 10°). In regard to the acute angle corners such as the patterns $P_1$ and $P_4$, two types of templates are prepared for detection of corners of opposite directions such as the patterns $P_1$ and $P_4$, two types of templates for black and white inversion, and 36 types of templates for rotation of the reference edge ER at an interval or pitch corresponding to one pixel (about 10°). Thus, 144 (2×2×36=144) templates are used for the purpose of detection of the acute angle corners such the patterns P1 and P4. Thus, each of the characteristics detection circuits 230 and 240 contains at least 1,000 templates.

FIG. 19 shows an example of the template which is adapted for detecting a step corner having a step height corresponding to two pixels with respect to the reference edge which is horizontal (0°). This template produces an output "1" when the horizontal reference edge, i.e., the boundary line between the logical values "1" and "0", of the reference data or the image data appearing in the window is sandwiched between the coordinates (H, 1) and (I, 1) and between the coordinates (H, 1) and (I, 7) while the edge of the step parallel to the reference edge extends so as to be sandwiched between the coordinates (F, 11) and (G, 11). The template shown in FIG. 19 judges that a step corner of a height corresponding to two pixels exists at a position corresponding to the central region of the window, on condition that the data on the coordinates (H, 1), (G, 3), (G, 5), (H, 7), (F, 11), (E, 12) and (F, 13) are all "1", while the data on the coordinates (I, 1), (J, 3), (J, 5), (I, 7) and (G, 11) are all "0". In this case, the templates produce a detection signal "1".

A distance corresponding to two pixels exists between the coordinates (G, 3), (J, 3) and (G, 5), (J, 5) for catching the reference edge. Therefore, the reference edge can be detected safely even when there is a slight distortion of the image due to an error caused during binary coding, or even when the edge draws a slight curve.

This template is adapted for detecting such a step corner of a height corresponding to two pixels that the lower half part of the area in the window is a black (0) portion of the pattern (Chrome), while the upper half part is a white portion "1" having no pattern. It is to be noted, however, a template is prepared for detecting an acute angle corner which is formed by replacing "1" and "0" with each other in the pattern as shown in FIG. 19.

Figure 23:
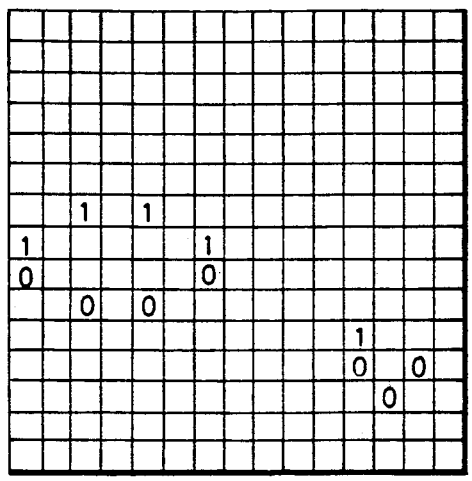
Figure 24:
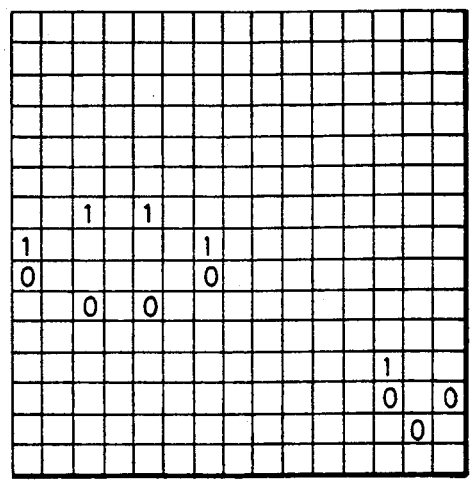

FIG. 20 shows a template for detecting a step corner having a step height corresponding to three pixels, formed by obliquely upwardly shifting four coordinates (F, 11), (G, 11), (E, 12) and (F, 12) in the template shown in FIG. 19 by a distance corresponding to one pixel. FIG. 21 shows a template for detecting a step corner having a step height corresponding to four pixels, formed by obliquely upwardly shifting four coordinates (F, 11), (G, 11), (E, 12) and (F, 12) in the template shown in FIG. 19 by a distance corresponding to two pixels. The templates shown in FIG. 19, 20 and 21 are for detecting such steps that project outward from the reference edge. In contrast, step corners which are recessed inwardly from the reference edge are detected by templates which are shown in FIGS. 22, 23 and 24.

Figure 25:
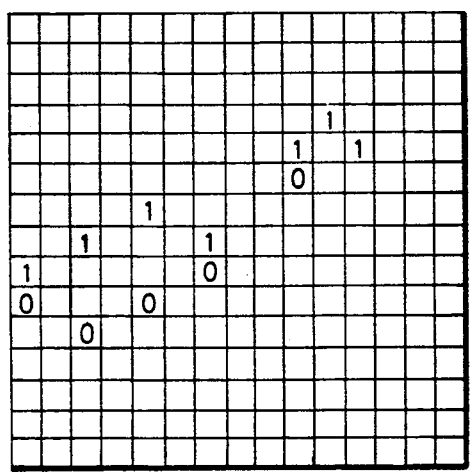
Figure 26:
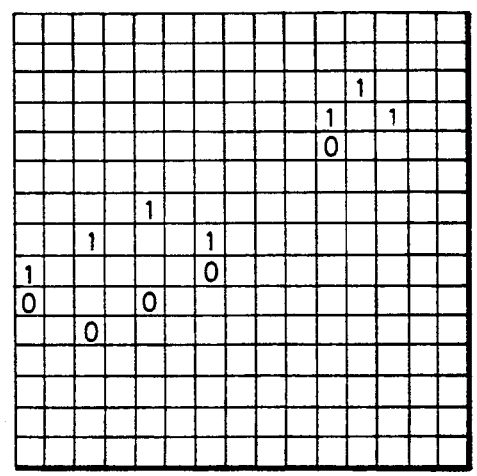
Figure 27:
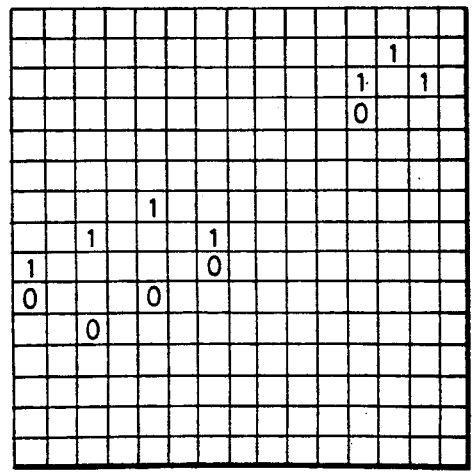

The reference edge of the pattern to be caught has to be detected regardless of its angle. In the described embodiment, therefore, templates are prepared which are obtained by rotating each of the templates shown in FIGS. 19 to 24 by an interval corresponding to one pixel (about 10°) about the central coordinate (H, 8) of the window. FIGS. 25, 26 and 27 show, respectively, templates obtained by rotating the templates of FIGS. 19, 20 and 21 about the coordinate (H, 8) by an angle corresponding to one pixel (about 10°). Since the template matching is conducted on the basis of binary-coded data, the pitch or unit rotation of the template cannot be reduced below the amount corresponding to one pixel, so that the resolution is not so high. On the other hand, however, the use of the binary-coded data enables any inclination angle of the reference edge to be accessed by a definite number of templates. Templates are also prepared by rotating the templates shown in FIGS. 22, 23 and 24 by an amount corresponding to one pixel (about 10°).

Figure 28:
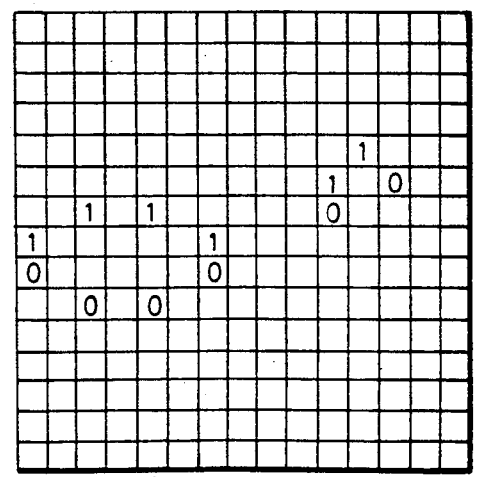
Figure 29:
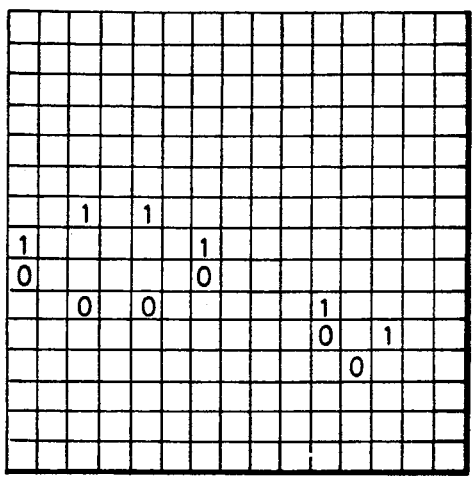

FIG. 28 shows an example of a template which is intended for detecting a corner bent at an obtuse angle with respect to the reference edge of 0°. The arrangement of pixels for forming this template is the same as that in the template shown in FIG. 19, except that coordinate (F, 13) in the template shown in FIG. 19 has the logical value "1" while the same coordinate has the logical value "0" in the template shown in FIG. 28. Another template shown in FIG. 29 is prepared for the purpose of detection of an obtuse angle pattern which is bent in the opposite direction to the pattern shown in FIG. 28. Each of the templates shown in FIGS. 28 and 29 for the detection of obtuse angle corners is prepared by a number which is equal to the numbers of the templates for detecting each of the step corners having step heights corresponding to two, three and four pixels. Needless to say, templates for the obtuse angle corners are prepared to cope with any angle of inclination of the reference edge.

Figure 30:
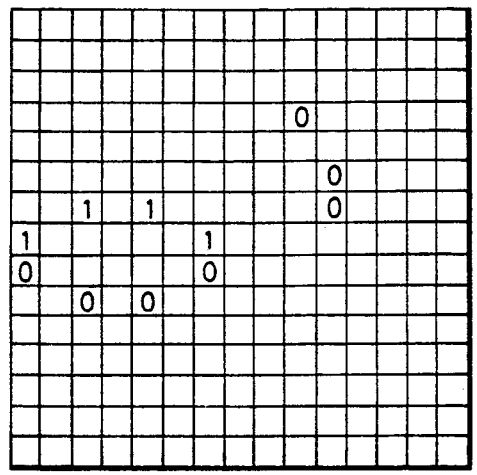
Figure 31:
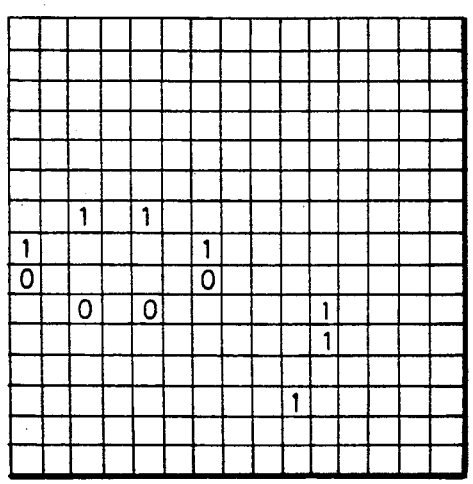
Figure 32:
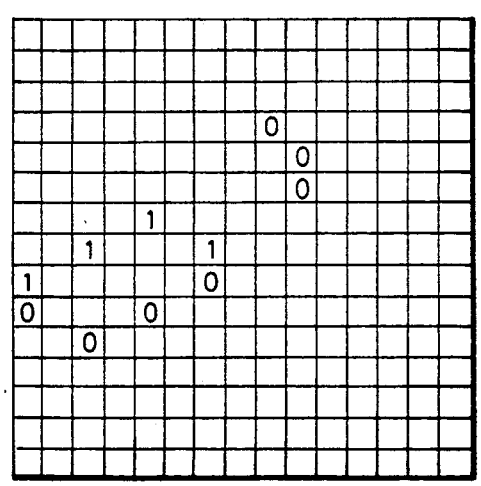
Figure 33:
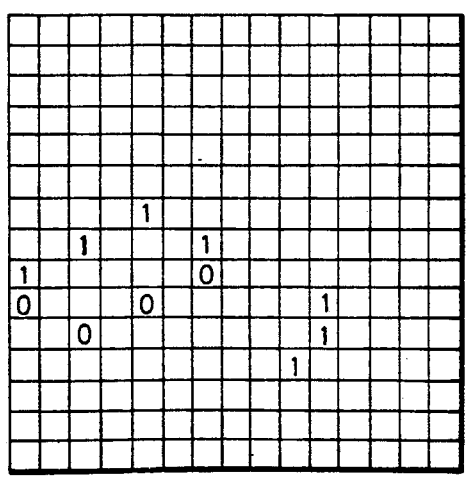
Figure 34:
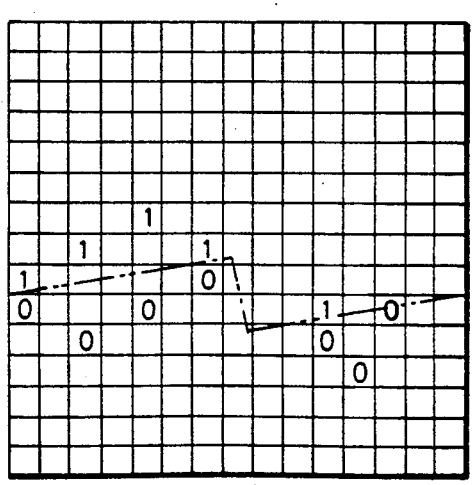
Figure 35:
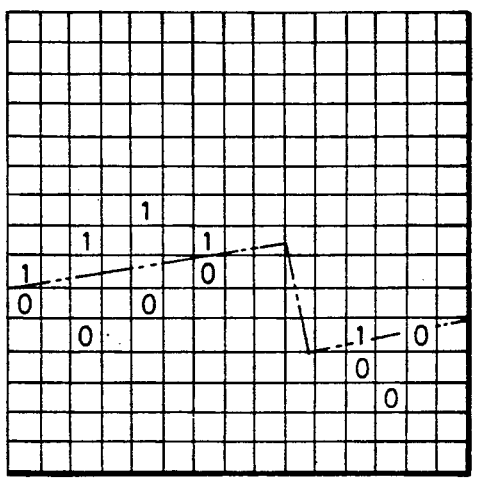
Figure 36:
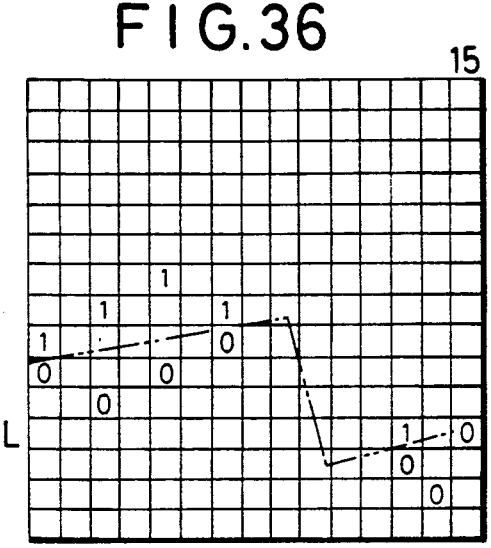

FIGS. 30 and 31 show templates for detecting the acute angle corners. The template shown in FIG. 30 is intended for detecting an acute angle pattern such as the pattern $P_1$ shown in FIG. 18, while the template shown in FIG. 31 is intended for detecting an acute angle corner such as that obtained by black and white inversion of the pattern $P_4$. FIG. 32 shows a template which is obtained by rotating the template shown in FIG. 30 counterclockwise by about 10°. FIG. 33 shows a template which is obtained by rotating the template shown in FIG. 31, counterclockwise by about 10°. FIGS. 34, 35 and 36 show, respectively, templates which are obtained by rotating the step-corner detecting templates shown in FIGS. 22, 23 and 24 counterclockwise by an amount of about 10°, respectively. These templates are capable of detecting step corners when the step corners are positioned as shown by imaginary lines.

Figure 37:
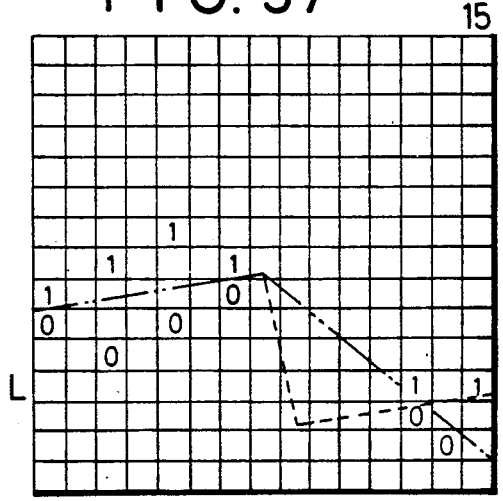

FIG. 37 shows an example of a template for detecting an obtuse angle corner. The arrangement of pixels in this template is the same as that in the template shown in FIG. 36 except that the sign of the coordinate (L, 15) has been inverted. Similarly, templates for detecting the obtuse angle corners of respective angles can be obtained simply by inverting the sign of one pixel in the templates shown in FIGS. 34 and 35. The template for the detection of an obtuse angle corner may detect a step corner as shown by a broken line in FIG. 37. This, however, does not cause any problem because there is no necessity for the discrimination between the characteristics of both types of corners, as will be explained later.

These templates may be constructed from logical gate characteristics such as AND elements, OR elements and INVERTER elements. It is to be noted, however, the scale of the circuit can be reduced by making an efficient use of PLDs (Programmable Logic Devices) having AND-OR gate arrays.

Figure 38:
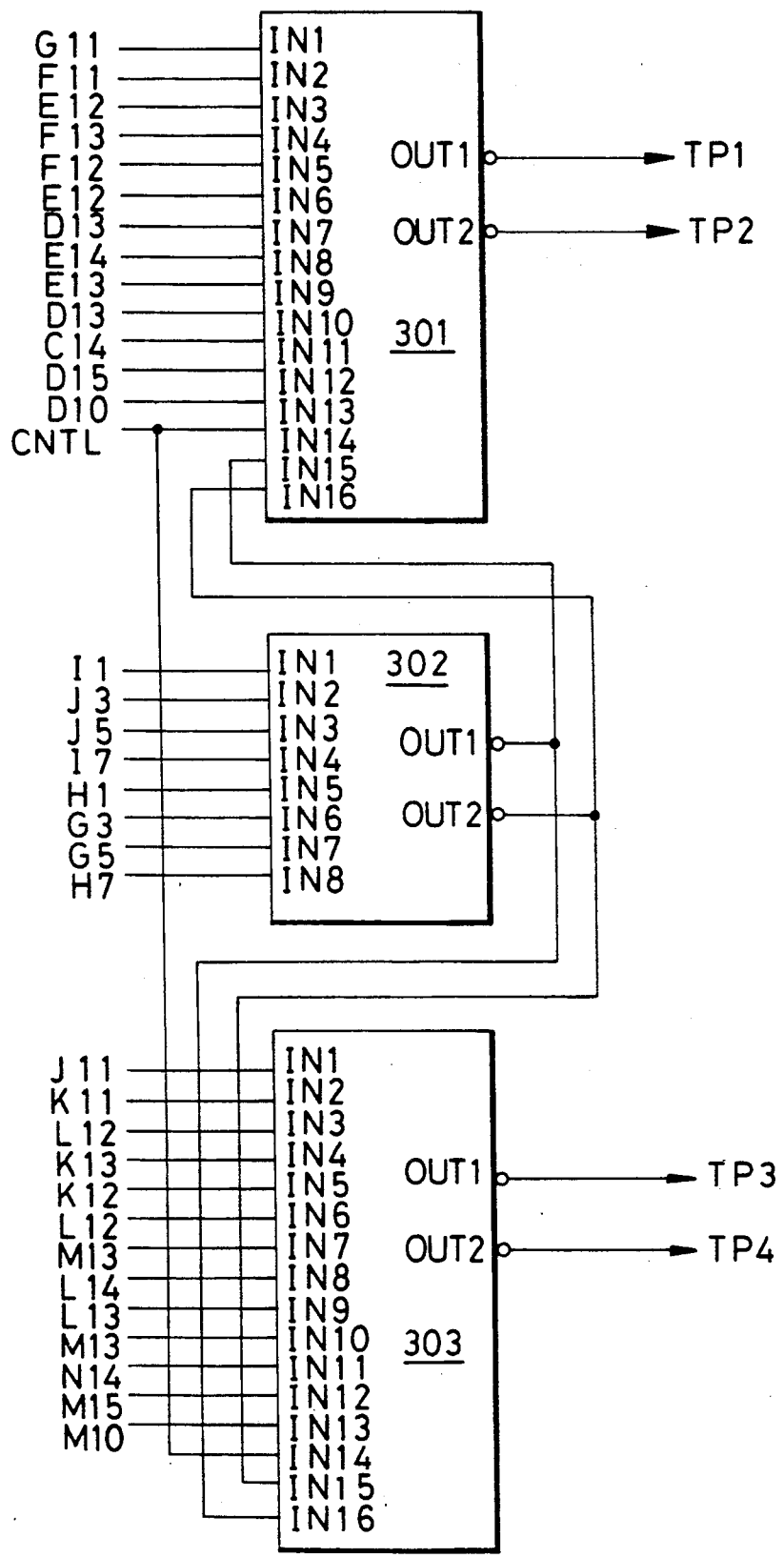
FIG. 38 is a circuit connection diagram illustrating an example of a template circuit.

FIG. 38 shows an example of a circuit arrangement in which three packages of PLD constitute 28 templates for a horizontal (0°) reference edge, including 14 templates for the reference edge of 0° and 14 templates which are obtained by substituting "1" and "0" for each other, in the first-mentioned 14 templates. More specifically, PLD packages 301 to 303 have input signal lines IN1 to IN16 and INVERT output signal lines OUT1 and OUT2. The package 302 is programmed in accordance with the following formulae (1) and (2).

$$\overline{OUT1} = \overline{IN1} \cdot \overline{IN2} \cdot \overline{IN3} \cdot \overline{IN4} \cdot IN5 \cdot IN6 \cdot IN7 \cdot IN8... \quad (1)$$

$$\overline{OUT2} \cdot IN1 \cdot IN2 \cdot IN3 \cdot IN4 \cdot \overline{IN5} \cdot \overline{IN6} \cdot \overline{IN7} \cdot \overline{IN8}... \quad (2)$$

where,  ̄ indicates logical negative (INVERT), while • represents logical product (AND).

The packages 301 and 303 are programmed in accordance with the following formulae (3) and (4).

$$\overline{OUT1} = (\overline{IN1} \cdot IN2 \cdot IN3 \cdot IN4 \quad (3)$$
$$+ \overline{IN1} \cdot IN2 \cdot IN3 \cdot \overline{IN4}$$
$$+ \overline{IN5} \cdot IN6 \cdot IN7 \cdot \underline{IN8}$$
$$+ \overline{IN5} \cdot IN6 \cdot IN7 \cdot \overline{IN8}$$
$$+ \overline{IN9} \cdot IN10 \cdot IN11 \cdot \underline{IN12}$$
$$+ \overline{IN9} \cdot IN10 \cdot IN11 \cdot \overline{IN12}$$
$$+ \overline{IN1} \cdot \overline{IN2} \cdot IN13) \cdot IN15$$

$$\overline{OUT2} = (IN1 \cdot IN2 \cdot IN3 \cdot \overline{IN4} \quad (4)$$
$$+ IN1 \cdot \overline{IN2} \cdot \overline{IN3} \cdot IN4$$
$$+ IN5 \cdot \overline{IN6} \cdot \underline{IN7} \cdot IN8$$
$$+ IN5 \cdot \overline{IN6} \cdot \underline{IN7} \cdot IN8$$
$$+ IN9 \cdot \overline{IN10} \cdot \overline{IN11} \cdot IN12$$
$$+ IN9 \cdot \overline{IN10} \cdot IN11 \cdot \underline{IN12}$$
$$+ IN1 \cdot IN2 \cdot IN13) \cdot IN16$$

where, + represents logical sum (OR).

Figure 39:
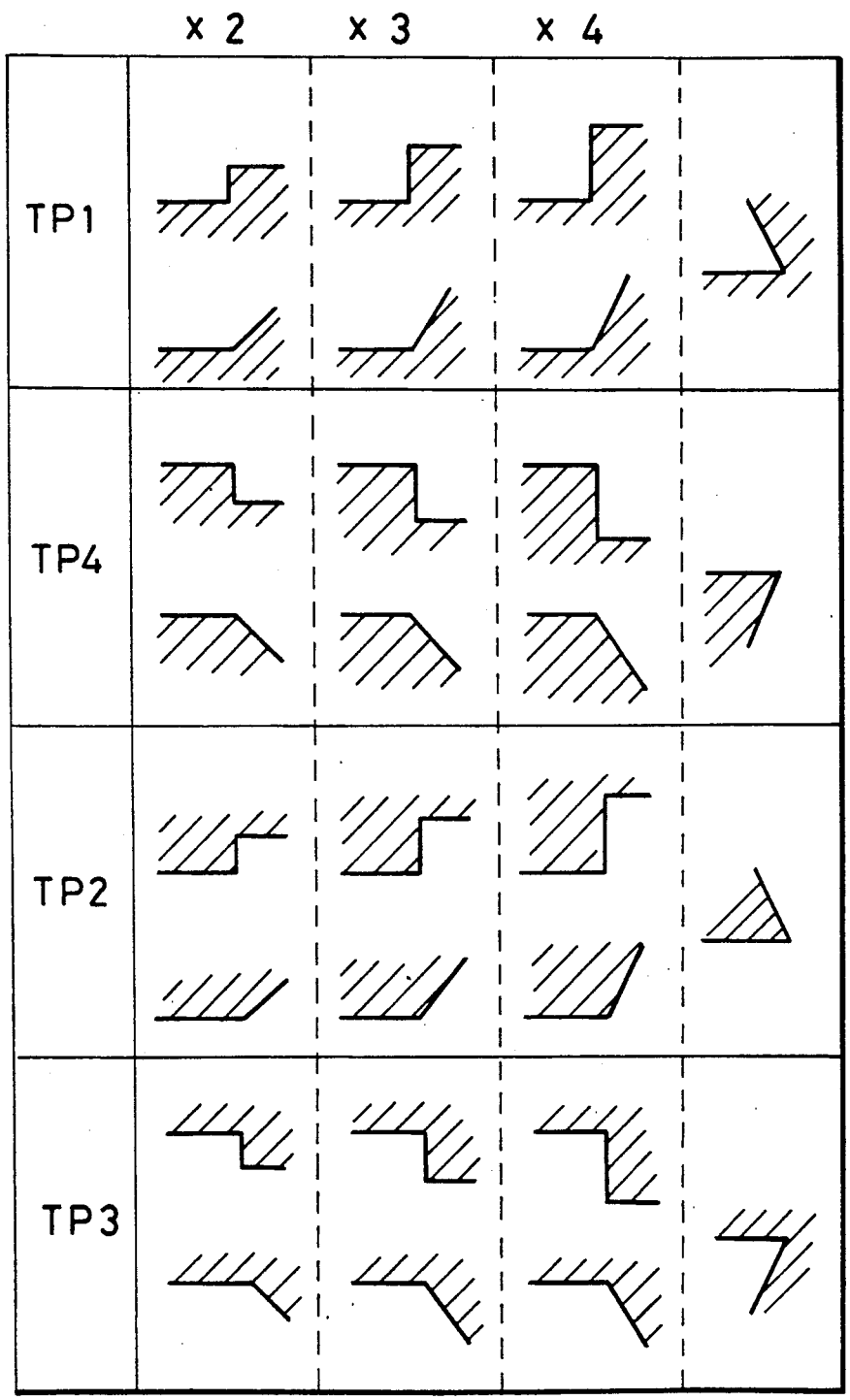
FIG. 39 is an illustration of grouping of all the patterns detected by the template circuit shown in FIG. 38.

In order to enable the package 302 to detect the reference edge of the angle 0°, the data on the coordinates (I, 1), (J, 3), (J, 5), (I,7), (H, 1), (G, 3), (G, 5) and (H, 7) are applied in a parallel manner to the inputs IN1 to IN8 of the package 302. The outputs OUT1 and OUT2 are respectively connected to the inputs IN15 and IN16 of the packages 301 and 303. The package 301 is capable of detecting, out of the window, all the step corners, obtuse angle corners and acute angle corners which are bent upwardly above the reference edge. In contrast, the package 303 is capable of detecting, out of the window, all the step corners, obtuse angle corners and acute angle corners which are bent downward below the reference edge. Thus, the outputs OUT1 and OUT2 of the package 301 respectively deliver 1-bit characteristics data TP1 and 1l-bit characteristics data TP2 Similarly, the outputs OUT1 and OUT2 of the package 303 respectively deliver 1-bit characteristics data TP3 and 1-bit characteristics data TP4. Consequently, the corners with respect to the reference edge of 0° represented by four data TP1 to TP4 are grouped into four groups, each containing seven types of corners as shown in FIG. 39. Each of the data PT1 to PT4 takes the "1" level when any one of seven types of corners of its group is detected. That is, the seven types of corners belonging to each group are regarded as being the same, and produce the same detection result, i.e., the data PT1 to PT4. There is a black and white inverted relation between the corners represented by the data PT1 and the corners represented by the data PT2. Similarly, there is a black and white inverted relation between the corners represented by the data PT3 and the corners represented by the data PT4.

Referring back to FIG. 38, an external control signal (1 bit) is delivered by the computer 22 and is input to IN14 of the packages 301 and 303. This external control signal CNTL is used, for instance, for the purpose of changing-over the operation between a mode in which the step corners having a height corresponding to two pixels is neglected and a mode in which such step corners are not neglected, thus changing the sensitivity of the characteristic detection in the defect inspection operation. To these ends, the terms in the formulae (3) and (4) for the detection of step corners corresponding to two pixels, i.e., $\overline{IN1} \cdot IN2 \cdot IN3 \cdot IN4$ and $IN1 \cdot \overline{IN2} \cdot \overline{IN3} \cdot IN4$; are re-preprogrammed in accordance with the following formulae (5) and (6).

$$\overline{IN1} \cdot IN2 \cdot IN3 \cdot IN4 \cdot IN14... \quad (5)$$

$$IN1 \cdot \overline{IN2} \cdot \overline{IN3} \cdot \overline{IN4} \cdot IN14... \quad (6)$$

As will be understood from the foregoing description, the characteristics detection circuit shown in FIG. 38 is adapted for detecting corners (28 types) on the reference edge of 0°. In order to cope with the detection of corners with respect to any angle of reference edge, 336 units of the circuit each having an arrangement shown in FIG. 38 are prepared.

A huge number (36×4) of characteristics data are obtained by using these templates. This huge number of data is edged into several pieces of data. In editing these data, it is necessary to recognize any corner defect existing in the vicinity of a corner of the pattern as being different from the corner of the pattern, for otherwise such a corner will be overlooked. To this end, sorting or classification is conducted as shown in FIGS. 40, 41, 42 and 43. This sorting is only illustrative and various other sorting methods can be employed. It is to be noted, however, that the sorting in this embodiment should be conducted in accordance with the following rules.

(1) All the characteristics of the recall pattern derived from the characteristics detection circuit 240 are grouped into four groups I to IV without any overlap, and the characteristics of the design data to be referred to as defined for each group.

(2) Characteristics which tend to appear at the same position or in the same region are included in the same group.

(3) Defects with respect to a reference edge of 150° for example are detected as a rule by templates which are prepared for the reference edge of 150°.

FIGS. 40 to 43 show all the types of the shapes of characteristic corners to be detected, for each about 10° rotation of the reference edge. The coordinate system XY coincides with the coordinate system on the stage. More specifically, the X axis coincides with the axis of a horizontal row of the pixels in the window, while the Y axis coincides with the axis of a vertical row of the pixels in the window.

Figure 44:
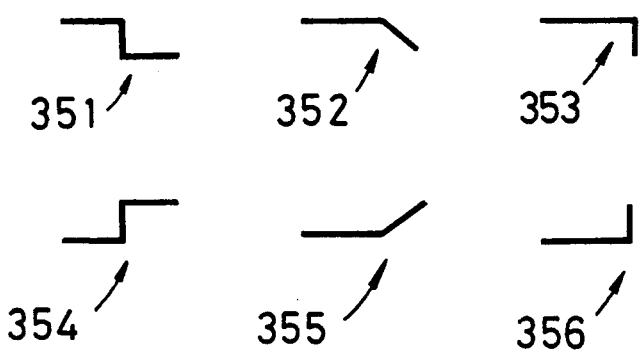
FIG. 44 is an illustration of symbols shown in FIGS. 40 to 43.

The shapes of the characteristic corners shown in FIGS. 40 to 43 are represented by six symbols 351 to 356 as shown in FIG. 44. Each symbol represents two types of corner shapes which are in black and white inversion relationship to each other. Each of the symbols 351, 3352, 354 and 355 which represent step corners and obtuse angle corners stands for three types of corners, i.e, corners corresponding to two pixels, corners corresponding to three pixels and corners corresponding to four pixels.

Figure 40:
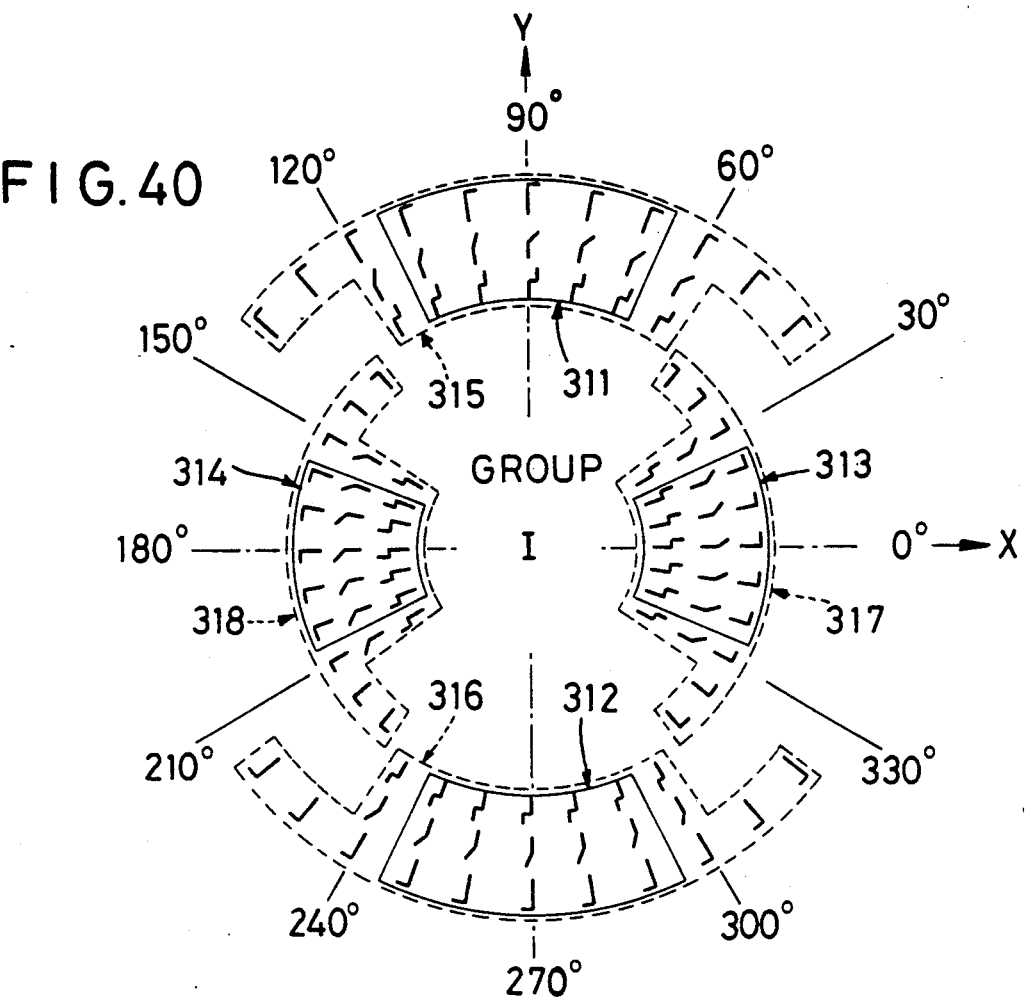
FIGS. 40 to 43 are illustrations of grouping of patterns according to the gradient of a reference edge.

The group I in FIG. 40 is 1-bit characteristic data extracted from the reference data which is the logical sum (OR) of the following characteristic data: the characteristic data derived from the template group 311 corresponding to data TP3 and TP4 shown in FIG. 39 in the angular region between about 70° and about 110°; the characteristic data derived from the template group 312 corresponding to data TP3 and TP4 in the angular region between about 250° and about 290 ; the characteristic data derived from the template group 313 corresponding to data TP1 and TP2 in the angular region between about 320° and about 20° ; and the characteristic data derived from the template group 314 corresponding to data TP1 and TP2 in the angular region between about 160° and about 200° .

Figure 41:
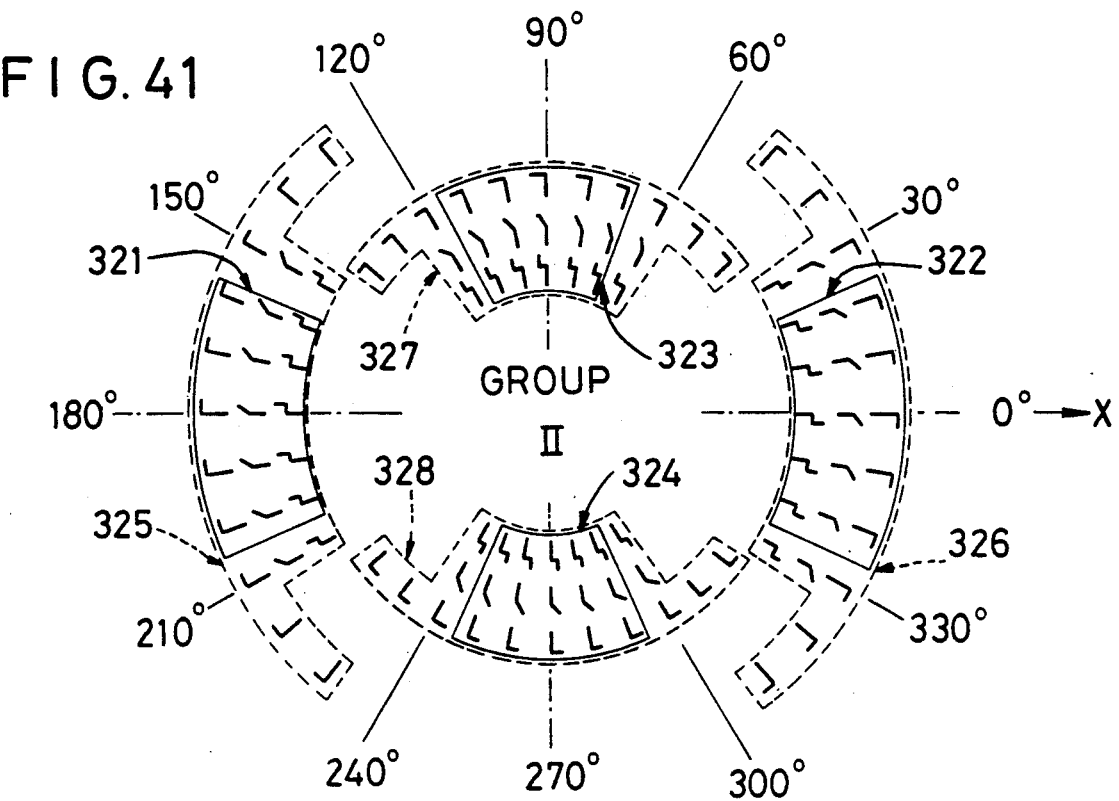

The group II is 1-bit characteristic data extracted from the reference data which is the logical sum (OR) of the four template groups 321, 322, 323 and 324, as will be understood from FIG. 41.

Figure 42:
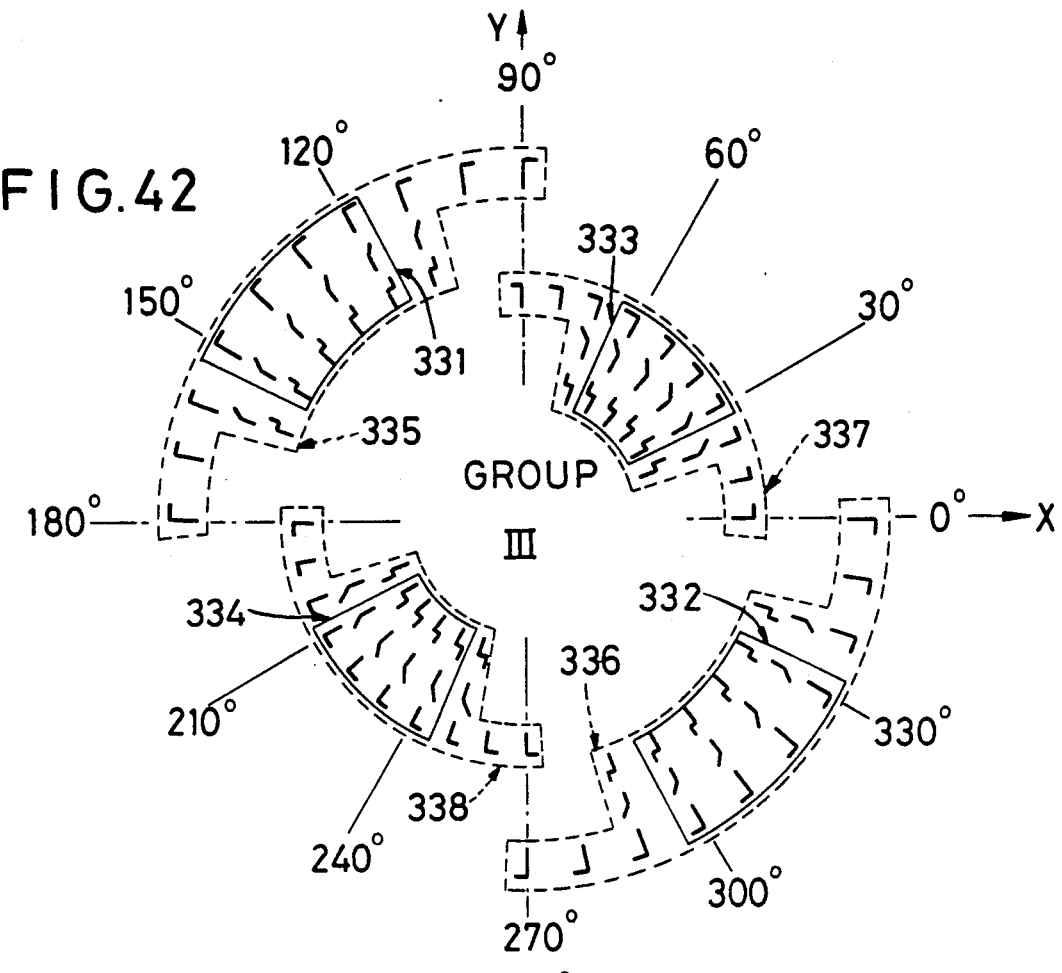
Figure 43:
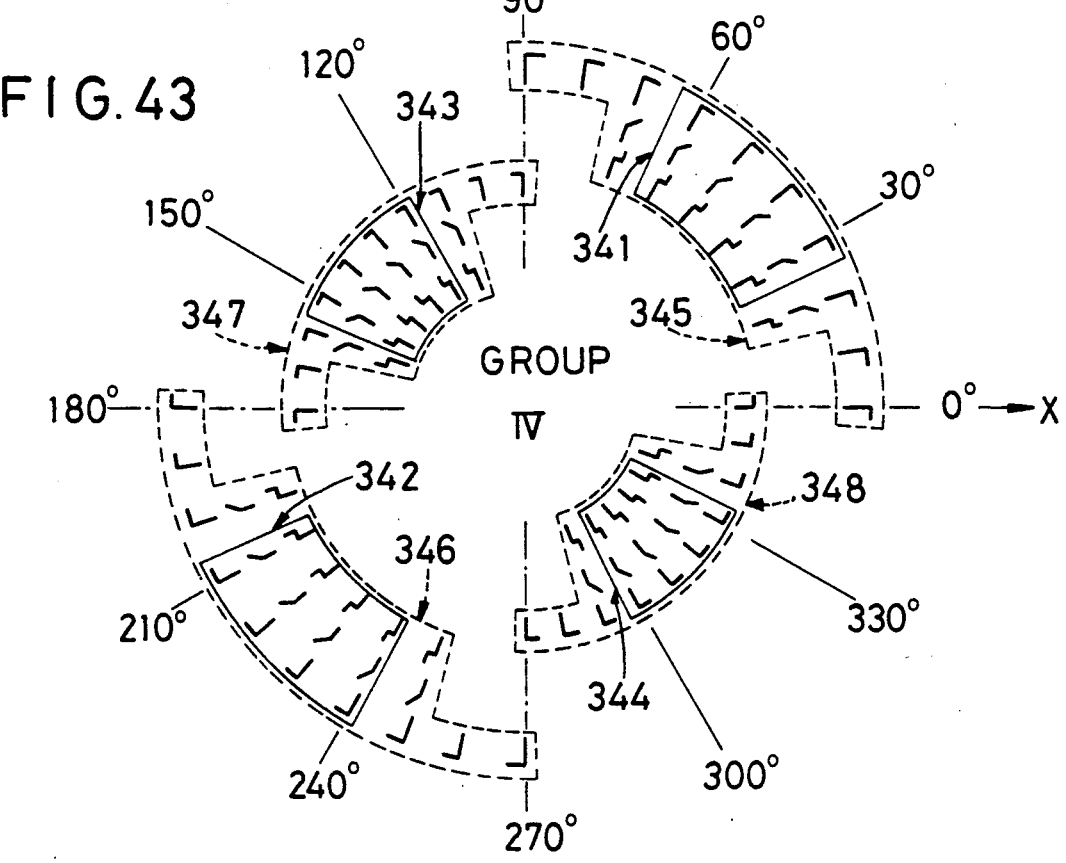

The group III is 1-bit characteristic data extracted from the reference data which is the logical sum (OR) of the four template groups 331, 332, 333 and 334, as will be understood from FIG. 42.

The group IV is 1-bit characteristic data extracted from the reference data which is the logical sum (OR) of the four template groups 341, 342, 343 and 344, as will be understood from FIG. 42.

In order to cope with special pattern forms such as small isolated patterns, this embodiment employs groups V and VI of the characteristic data. The group V is a single data which is formed of the characteristics data derived from all templates capable of detecting three types of corners which are bent such that the areas of patterns such as of chrome above or below the reference edge Er are increased. On the other hand, the group VI is a single data which is formed of the characteristics data derived from all templates capable of detecting three types of corners which are bent such that the areas of patterns such as of chrome above or below the reference edge Er are decreased.

Each group of the characteristics data from obtained is output as 1-bit characteristics data from the characteristics detection circuit 230 and 240. As will be understood from FIG. 39, the data of the group V is the logical sum (OR) of the data TP1 and the data TP3, while the data of group VIV is the logical sum (OR) of the data TP2 and the data TP4.

When the image data and the reference data have corresponding characteristics which are in the vicinity of the border between two groups, there is a risk that the characteristics of the image data is sorted into one of these groups while the characteristic of the reference data is sorted into the other of two groups. In such a case, the characteristic on the image data may be erroneously judged as being a defect, although it is not a defect actually. In order to eliminate such a problem, it is necessary to broaden the scope of detection of the characteristics on the reference data as compared with that on the image data.

Figure 45:
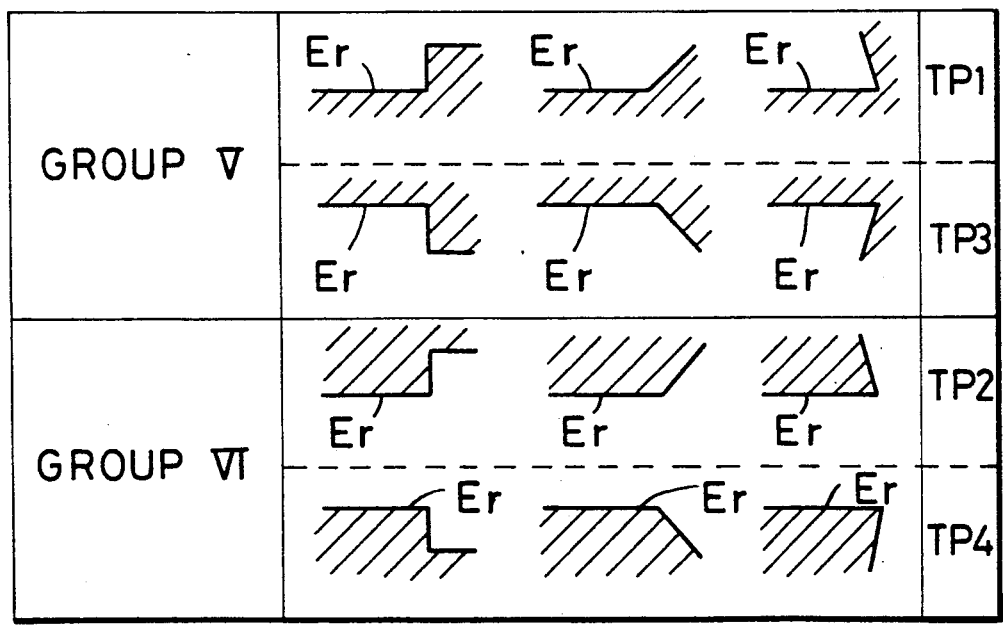
FIG. 45 is an illustration of grouping of patterns according to another classification standard.

Basically, the characteristics detection circuit 230 for the reference data is equipped with a template group consisting of 1,008 templates, as in the case of the characteristics detection circuit 240 for the image data. However, the editing of the output from the characteristics detection circuit 230 is conducted in a manner which is shown by broken lines in FIGS. 40 to 43. In group I shown in FIG. 40, the templates 315, 316, 317 and 318 for the reference data comprise, respectively, the templates 311, 312, 313 and 314 for the image data, and are set to cover angular ranges of 10° to 30° on both sides of the respective templates for the image data. This applies also to groups II, III and IV. As to the groups V and VI, the principle as shown in FIG. 45 applies.

The characteristics data of the groups I to VI from the characteristics detection circuit 240 for the image data are represented hereinafter by GI to GVI, while the characteristics data of the groups I to VI from the characteristics detection circuit 230 for the reference data are represented hereinafter by GI' to GVI'.

The enlarging circuit 250 shown in FIG. 17 receives six characteristics data GI', GII', GIII', GIV', GV' and GVI', and enlarges these characteristics data.

Figure 46A:
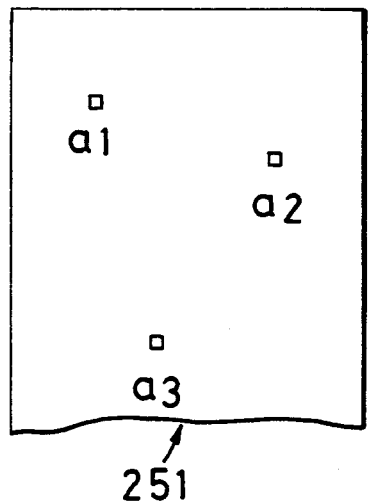
FIG. 46A and 46B are illustrations of the manners in which a pattern is enlarged by an enlarging circuit.
Figure 46B:
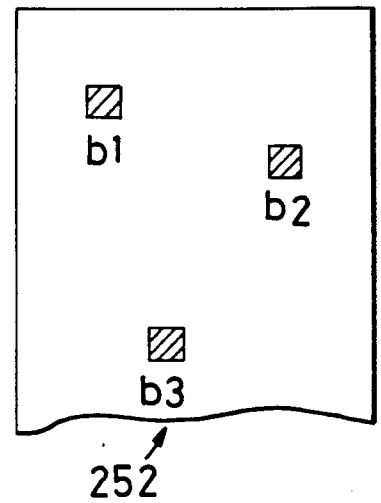

FIG. 46A shows the positions of the pixels a1, a2 and a3 which are generated within the image area 251 of 512×N bits. Assuming here that the image area 251 is formed of the characteristics data GI' for example, all the pixels a1, a2 and a3 bear logical values which are "1", while all other pixels bear logical values "0". FIG. 46B shows the positions of the enlarged characteristic portions b1, b2 and b3 formed in the image area 252 of 512×N bits by enlarging the characteristic pixels a1, a2 and a3 by the enlarging circuit 250. In this embodiment, each of the enlarged characteristic portions has a size corresponding to 15×15 pixels, and all the 15×15 pixels bear logical values which are "1". It is to be noted also that the position of the center of each of the enlarged characteristic portions coincides with the center of the corresponding pixel a1, a2 or a3. The circuit arrangement for conducting the enlargement is basically the same as that shown in FIG. 13. There are six such circuit arrangement in the enlarging circuit 250, corresponding to the characteristics data GI' to GVI'.

Figure 47:
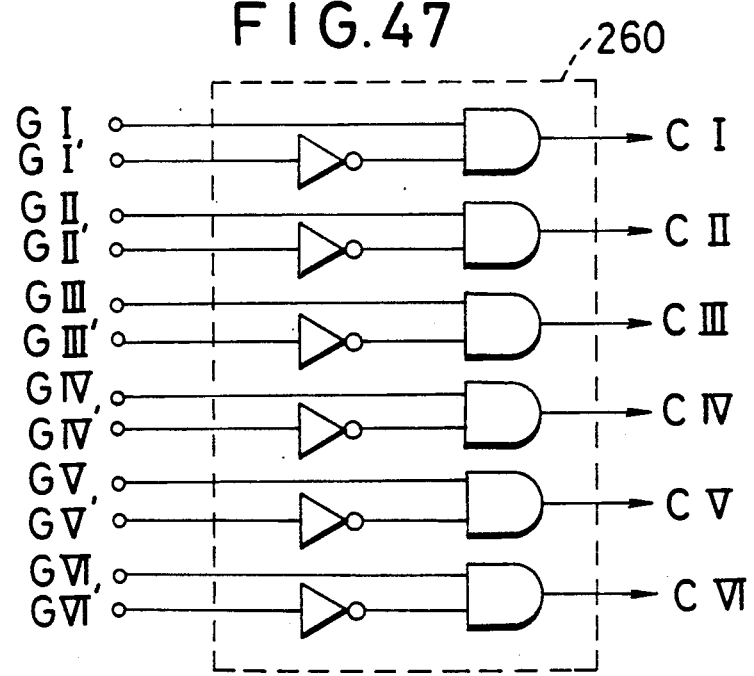
FIG. 47 is a circuit diagram of an inspection circuit.

FIG. 47 illustrates the arrangement of the inspection circuit 260. The characteristics data GI to GVI from the characteristics detection circuit 240 are input to six AND circuits, respectively, while the characteristics data GI' to GVI' enlarged by the enlarging circuit 250 are inverted by six inverters and then input to the six AND circuits, respectively. The AND circuits are adapted for delivering defect data CI to CVI to a shift register 270 (FIG. 17). When at least one of the six defective data is "1", a judgment is made to decide that a defect (or defects) exists in the corresponding portion or portions of the pattern formed by the image data.

The shift register 270 is adapted to store the defect data from the inspection circuit 260 in a memory circuit at an address corresponding to the position of the defect. The thus stored defect data is collected into a batch of defect data including a predetermined quantity of data, and is read by the computer 22 and stored in the memory device 24.

A description will be given hereinafter as to the significance of the editing explained in connection with FIGS. 40 to 43. FIG. 48 shows an example of a typical form of a defect in a pattern on the object, as well as the manner in which patterns are compared. For instance, when the design pattern is a linear edge as indicated by A, no characteristic data is produced on this edge of the design pattern. On the other hand, the real pattern includes a defect which projects from the corresponding linear edge of the real pattern. In this case, the data GIII from the template group 333 and the data GIV and GV from the template group 342 (see FIG. 45) are produced as characteristics data of the image data DI. Namely, the defect data CIII, CIV and CV take the logical value "1".

In case of the defect form indicated by B, the characteristic on the design pattern is detected by the template groups 315 and 318 so that data GI', GII' and GVI' are produced. In some cases, the 90° apex corresponding to the edge in the design pattern is slightly rounded in the real pattern. The rounded apex may be treated as being a defect. However, an apex is judged as being not defective, provided that the extent of the rounding is small. In such a case, characteristics detection is performed on the real pattern by the templates 341 and 343 so that characteristics data GIV and GVI are produced. However, as will be seen from the construction of the circuit shown in FIG. 47, the apparatus judges that there is no defect in the real pattern, when there is no characteristic portion in the image data while the reference data DR has a characteristic portion. In this case, therefore, no defect data is produced. However, when the extent of the rounding is increased to some extent, such a rounding is detected as being defective because the positions where the characteristic portion starts to appear are deviated from those in the design pattern.

Characteristics data GIII, GIV, GV and GVI are produced in case of the pattern form indicated by (C) in FIG. 48. On the design pattern, however, the data GIII and GV are "0". In this case, therefore, this pattern form is detected as being defective.

A description will be given hereinafter as to another example of the characteristics extraction circuit 200. The characteristics extraction circuit which will be explained hereinafter is composed of the following three constituents, namely, means for detecting an edge of a pattern on an object from image data DI and for outputting image edge data relating to the angle and the position of the edge; means for detecting, from reference data DR, a reference edge which will appear when the pattern is formed ideally, and outputting reference edge data relating to the angle and position of the reference edge; and means for receiving both the image edge data and the reference edge data and for producing defect data when one of the image edge data and the reference edge data does not fall within an allowable region which is determined in accordance with the angle and position given by the other of the image edge data and the reference edge data.

Figure 49:
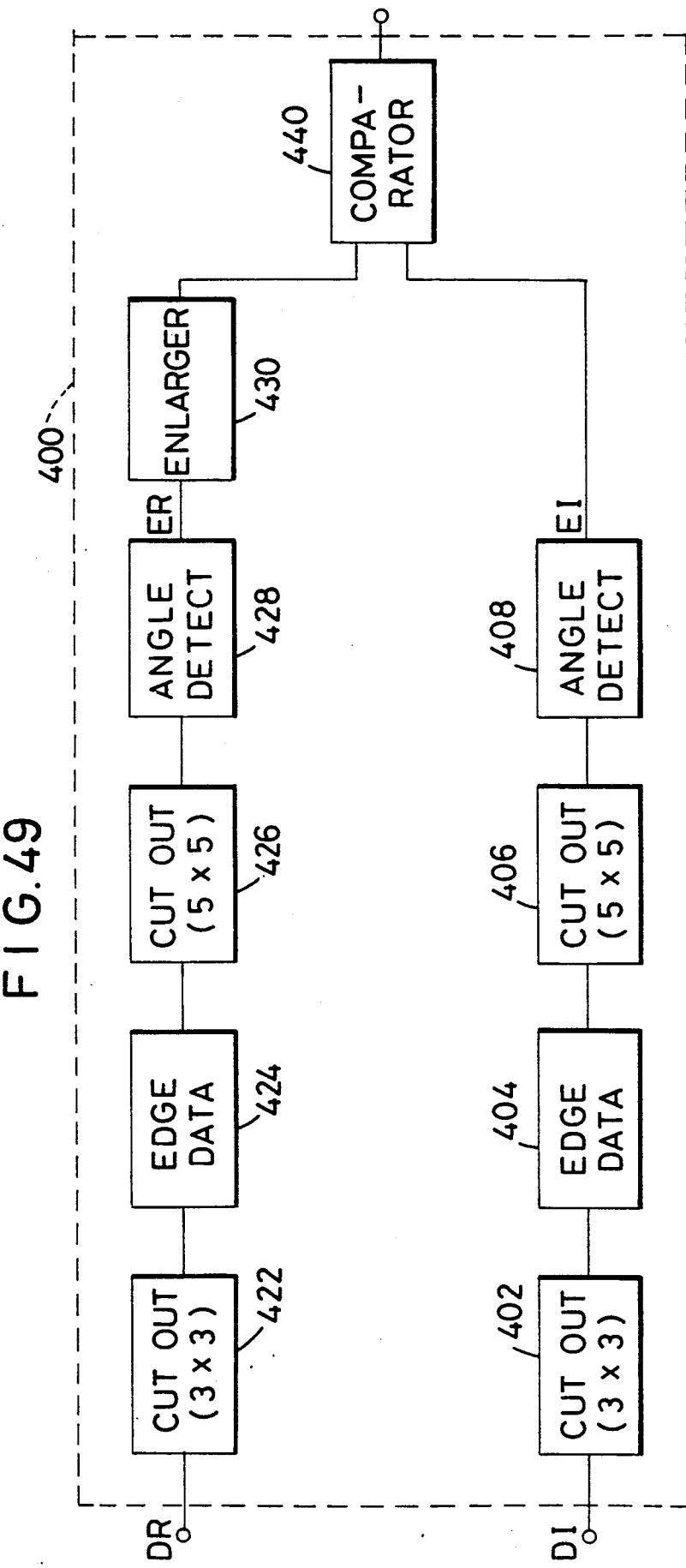
FIG. 49 is a block diagram of another example of the characteristics extraction circuit.

FIG. 49 shows this example of the characteristics extraction circuit which is denoted by 400.

The image data DI from the binary coding circuit is output to a cut out circuit 402. The cut out circuit 402 performs the same function as the cut out circuits which are shown in FIGS. 3 and 4. The circuit arrangement of the cut out circuit 402, however, is different from those of the cut out circuits 102 and 104, as will be understood from the following description taken in conjunction with FIG. 50.

The input image data DI is digital data having N lines each containing 512 pixels. When the first line is being input, a control circuit 412 turns on a three-state buffer B1, while turning off buffers B2 and B5, thus writing the image data DI in a random access memory RAM1. Each of the RAMs, RAM1 to RAM5 has a storage capacity which is not smaller than 512 addresses ×4 bits. This operation enables the image data carried by the 512 pixels of the first line of the data DI to be written in the corresponding addresses in the RAM1. At the same time, the RAM1 delivers signals which are the same as the input image data to a rearranging (replacing) circuit 414.

When the data on the second line is being input, the control circuit 412 turns the three-state buffer B2 on, while turning off the buffers B1 and B3 to B5, so that the image data carried by the second line is written in the RAM2. Simultaneously, the RAM1 reads the image data of the first line which has been written therein and sends the same to the rearranging circuit 414, while the RAM2 delivers to the rearranging circuit 414 the same data as the image data on the second line input thereto. Thus, the image data on the successive lines are written in successive RAMs. The RAMs other than the RAM into which the data is being written are set in the state for reading data therefrom. Thus, when the image data on the fifth line is being written into the RAM5, the RAMs RAM1, RAM2, RAM3, and RAM4 are ready for reading of the image data on the first, second, third and the fourth lines. The rearranging circuit 414 therefore receives image data corresponding to five lines, including the same data as the input image data DI (0 line delay) through the data which is obtained by delaying the data DI by an amount corresponding to four lines.

When the image data of the next line, i.e., the sixth line, is being input, the rearranging circuit 414 receives image data on five lines, including the data delayed by the 0 line through the data delayed by four lines. Thus, the rearranging circuit 414 always receives image data on five lines including the data delayed by the zero line through the data delayed by four lines.

The data rearranging circuit 414 is composed of PLDs (Programmable Logic Devices). Upon receipt of the control signal from the control circuit 412, the data rearranging circuit 414 operates to change-over the correspondence between the input data of these five lines and the output terminals thereof, each time the one-line image data is obtained. In consequence, five shift registers SR51 to SR55 receive the 0-line delayed image data to four-line delayed image data, respectively.

The control circuit 412 operates in response to a timing signal CL such as the sampling clock of the image take-up device 14, so as to control the states of the three-state buffers B1 to B5, addresses in the RAMs RAM1 to RAM5, reading and writing, and the operation of the rearranging circuit 414.

Figures 51, 52, 53:
FIGS. 51 and 52 are schematic illustration of a window.
FIG. 53 is an illustration of pixels of a template for forming edge data.

The shift registers SR51 to SR55 are 5-bit serial input/parallel output shift registers, and are adapted to shift the input image data bit by bit in synchronism with the clock CL. In consequence, the picture data DI is developed into a window of 5×5 pixels as shown in FIG. 51.

Figure 50:
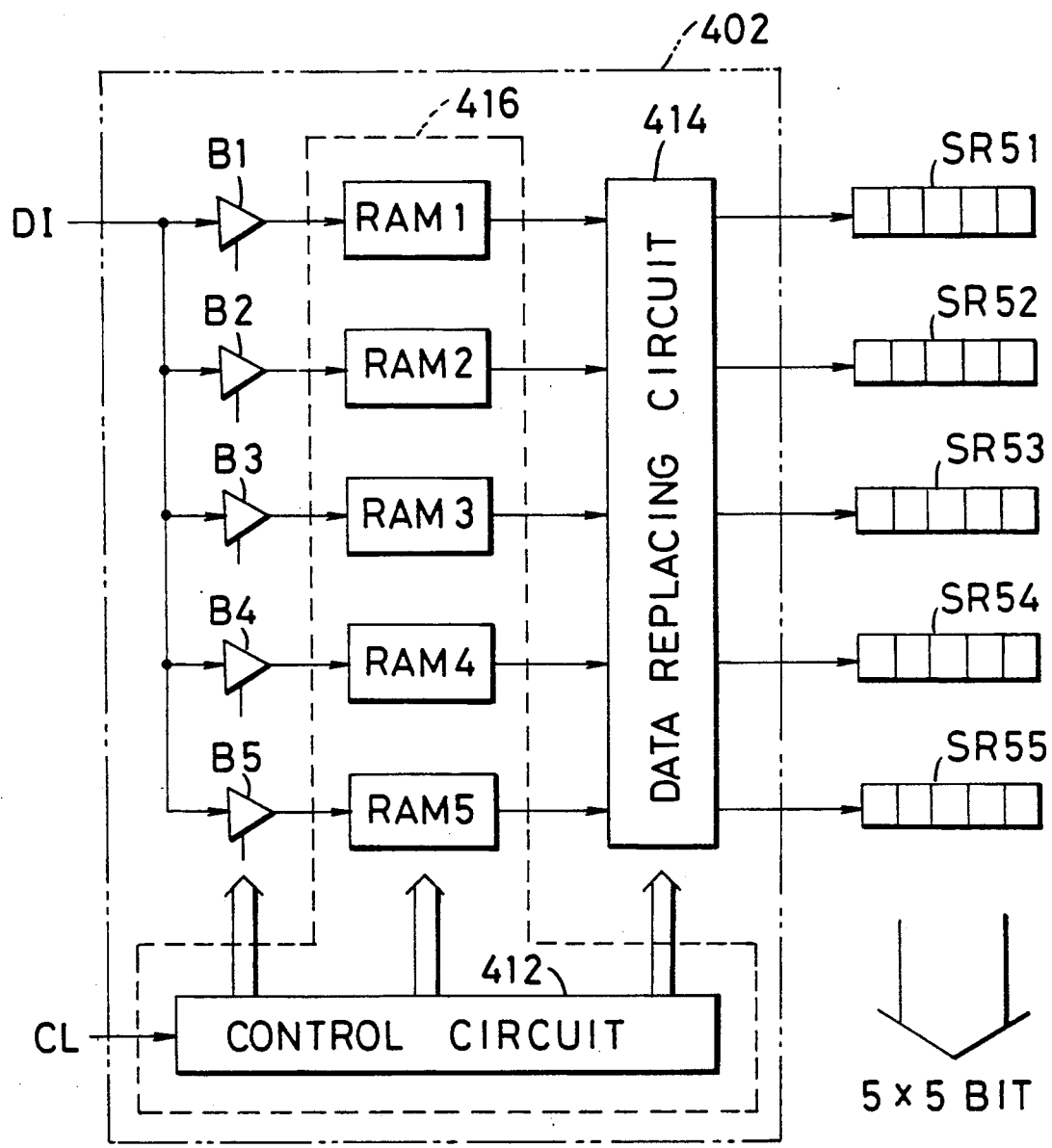
FIG. 50 is a circuit diagram of a cut-out circuit.

The image data in the window output from the cut out circuit 402 shown in FIG. 50 has a size corresponding to 5×5 pixels. However, since the size of the window which defines the data required by the edge image forming circuit 404 is 3×3 pixels, the window for the edge image forming circuit 404 is formed by making use of a part of the window shown in FIG. 52. In this case, the buffers B4 and B5, RAMs RAM4 and RAM5 and the shift resisters SR54 and SR55 are dispensed with. In this embodiment, however, RAMs RAM4 and RAM5 are not neglected because these memories are utilized also for the constitution of the four cut out circuits 402, 422, 406 and 426 explained in connection with FIG. 49.

Thus, the cut out circuit 402 actually produces a 9-bit parallel output corresponding to the respective pixels.

The RAMs RAM1 to RAM5 are memories each having 512 bytes and a word length of 4 bits (512 ×4 bits). Therefore, the circuit 416 shown in FIG. 50 is capable of simultaneously outputting signals of four bits in a parallel manner when one address is accessed. By providing additional three circuit units each having circuits similar to the three-state buffers B1 to B5, rearranging circuit 414 and the shift registers SR51 to SR55, it is possible to write and read 4-bit data (four types of data) into and out of the RAMs RAM1 to RAM5 in a parallel manner. It is, therefore, possible to form four cut out circuits 402, 422, 406 and 426 which operate at the same timing and which make common use of the RAMs RAM1 to RAM5.

The image data DI having the form of a 9-bit parallel output from the cut out circuit 402 is input to the edge data forming circuit 404. The edge data forming circuit 404 has four templates as shown in FIG. 53 which are adapted for forming edge data profiling the image data DI. Each of the templates has a logical value "1" located at the center thereof. The circuit 404 is adapted to compare the four templates with the image data cut out by the cut out circuit. When logical value "1" is located at the center of the image data of 3×3 pixels while logical value "0" is located on the upper, lower, left or the right side thereof, the circuit 404 judges that the condition of the template has been satisfied and outputs a logical value "1", whereas, when none of the conditions of the template is met, it outputs a logical value "0". In consequence, the edge data derived from the circuit 404 represents the profiling portion of the pattern included in the image data, and is represented by a logical value "1".

The output from the circuit 404 is delivered in the form of a time-sequential signal through a single line.

The edge data formed by the circuit 404 is sent to the edge angle detection circuit 408 after cutting of the local region of 5×5 pixels by the cut out circuit 406. The cut out circuit 406 has a construction similar to that of the cut out circuit 402, and is adapted for forming edge data in the form of a window as shown in FIG. 51. However, the shift registers SR54 and SR55 are necessary because the edge data has a size corresponding to 5×5 pixels. Thus, the actual output from the cut out circuit 406 takes the form of a 25-bit parallel output corresponding to the respective pixels.

The angle detection circuit 408 operates so as to apply the templates shown in FIGS. 54 to 59 to the edge data of the window formed on the basis of the image data, and forms a 4-bit edge angle signal EI corresponding to four angles of 0°, 45°, 90° and 135°. The templates are grouped into four groups as shown in Table 1, in order to enable these four edge angles to be detected, and these groups are successively applied to the window edge data. If the condition of at least one of the templates in a group is met, a judgement is made to conclude that an edge exists having an angle corresponding to the group which contains the matched template. In the edge angle signal EI, therefore, a logical value "1" is placed in the bit corresponding to the template group containing the matched template, and this edge angle signal EI is sent to a comparator circuit 440 which will be explained later. Thus, the edge angle signal is a 4-bit parallel signal. The operation for detecting the edge angle is to group the edges of any angle on the pattern carried by the object into four types of edge, i.e., the edges having angles of 0°, 45°, 90°, and 135°.

Table 1 Template groups for Image Data DI

TABLE 1

Figure 54:
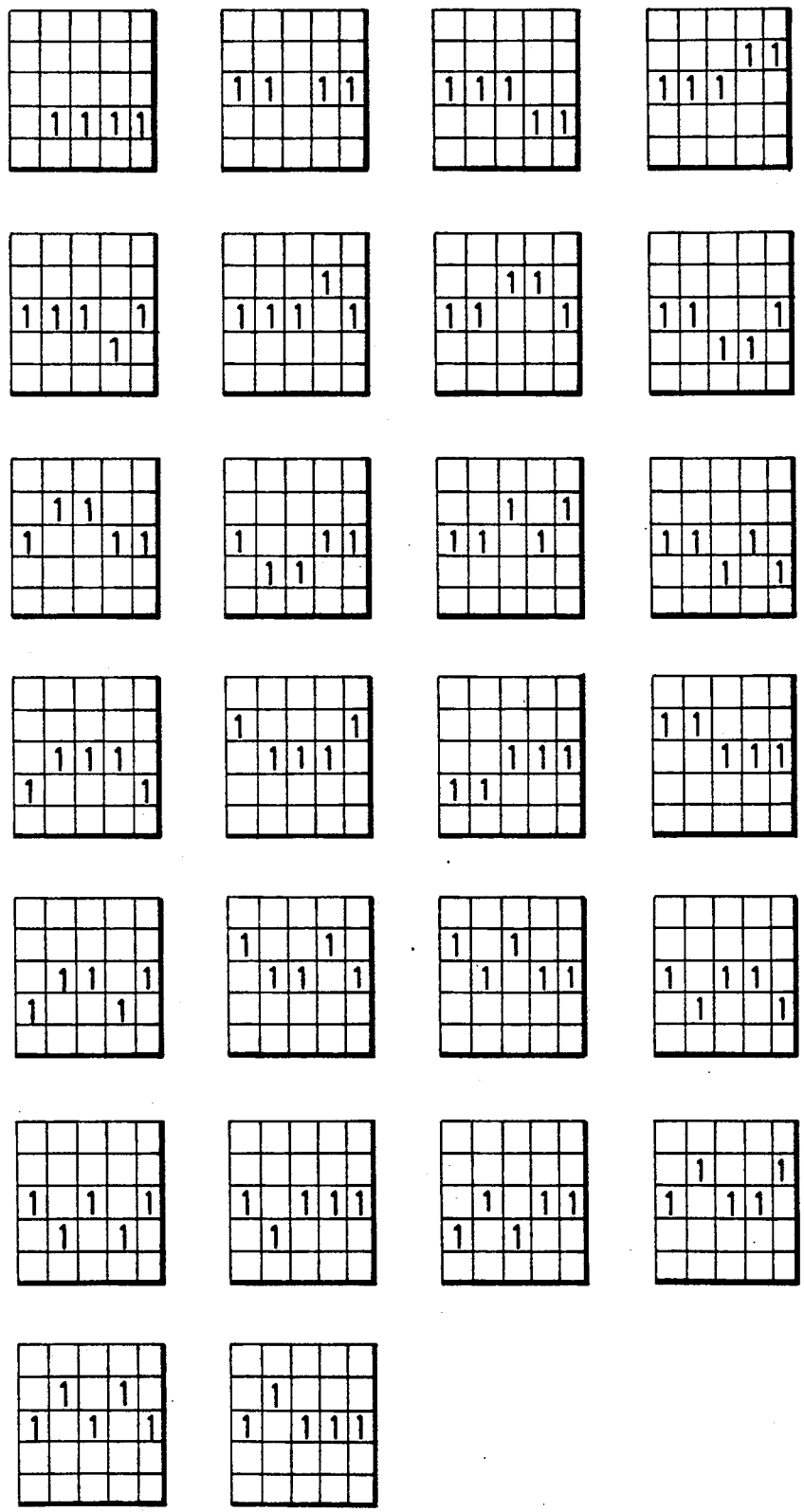
FIG. 54 to 59 are illustrations of arrangements of pixels of templates for detecting edge angle.
Figure 55:
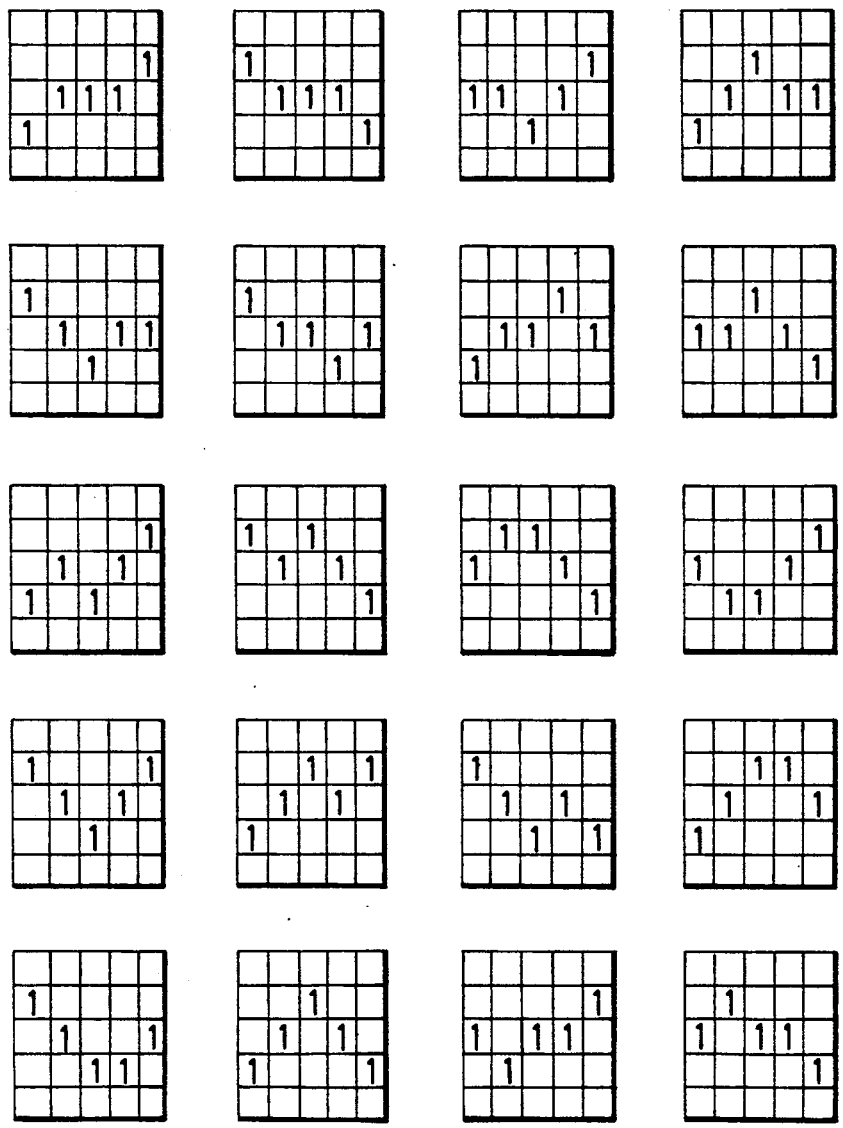
Figure 56:
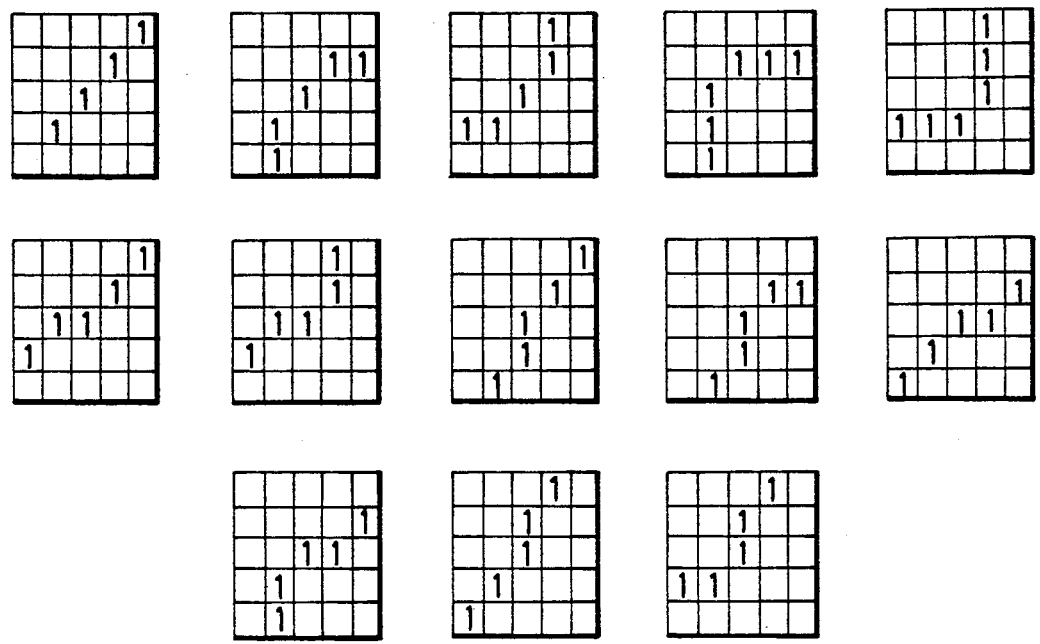
Figure 57:
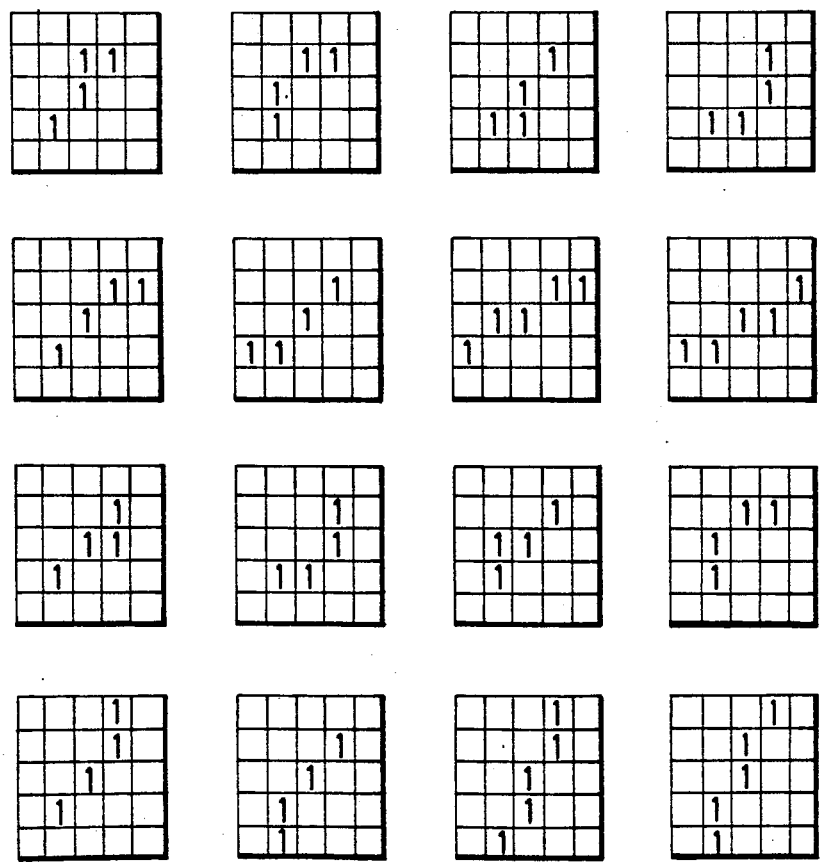

| | Template groups for Image Data DI | |
|---|---|---|
| | For low sensitivity | For high sensitivity |
| 0° | FIG. 54 | FIGS. 54 and 55 |
| 45° | FIG. 56 | FIGS. 56 and 57 |

TABLE 1-continued

| | Template groups for Image Data DI | |
|---|---|---|
| | For low sensitivity | For high sensitivity |
| 90° | 90° rotation of templates shown in FIG. 54 | 90° rotation of templates shown in FIGS. 54 and 55 |
| 135° | 90° rotation of templates shown in FIG. 56 | 90° rotation of templates shown in FIGS. 56 and 57 |

For instance, an edge having an angle of 22.5° can produce an edge angle signal either in the group of 0° and 45° or in both these groups. Thus, the selection of the arrangement of the templates and the grouping of the templates are conducted in such a manner as to give a certain tolerance in the detection of the edge angle.

Referring to Table 1, when the template groups for the higher sensitivity are selected, the number of types of the edges corresponding to the edge angle to be detected is increased so that a higher sensitivity of defect inspection is attained. In the described embodiment, a switching is conducted between the "high sensitivity mode" and the "low sensitivity mode" depending on the purpose of the pattern defect inspection. Alternatively, the defect detection is conducted in both modes so as to obtain different defect detection signals and one of these signals is suitably selected by the computer 22.

On the other hand, the reference data DR output from the pattern modifying circuit 26 shown in FIG. 1 is cut by the cut out circuit 422 shown in FIG. 49 into a window having a size corresponding to 3×3 pixels, as in the case of the image data DI output from the binary coding circuit 16. The thus cut out data is changed into reference edge data by the edge data forming circuit 424. The edge data is cut out by the cut out circuit 426 through a window of a size corresponding to 5×5 pixels.

The circuits 422, 424 and 426 have constructions which are the same as those of the circuits 402, 404 and 406 explained before.

An edge angle detection circuit 428 is adapted for forming an edge signal ER by a method which is similar to that conducted by the edge angle detection circuit 408 explained before i.e., by applying templates to the edge date derived from the cut out circuit 426. The templates used for this purpose are shown in Table 2.

In this case, the same template groups are used both for high-sensitivity pattern defect detection and low-sensitivity pattern defect detection.

TABLE 2

Figure 58:
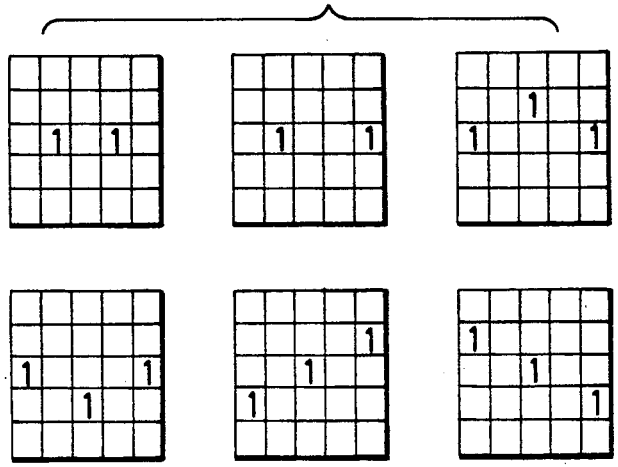
Figure 59:
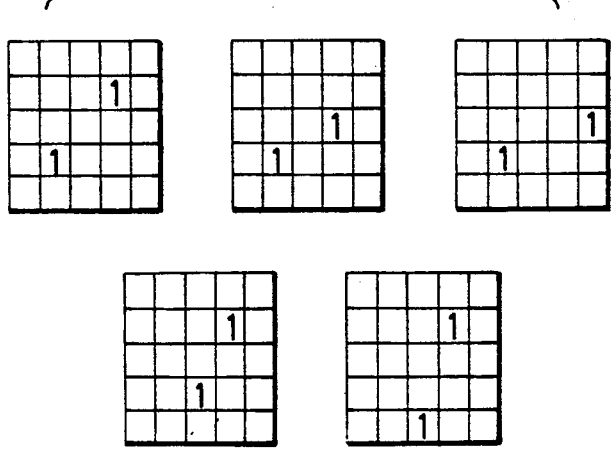

| Template Groups for Reference Data DR | |
|---|---|
| 0° | FIG. 58 |
| 45° | FIG. 59 |
| 90° | 90° rotation of templates shown in FIG. 58 |
| 135° | 90° rotation of templates shown in FIG. 59 |

The angle detection circuit 428 produces, as in the case of the angle detection circuit 408, 4-bit edge angle signals ER corresponding to four angles, i.e., 0°, 45°, 90° and 135°. However, the templates are prepared such that the angular regions which are regarded as being materially the angles 0°, 45°, 90° and 135° are somewhat wider than those in the edge angle detection for the image data. This means that the reference edge data has a greater tolerance than the image edge data.

The number of templates shown in Table 1 is greater than that in Table 2. This makes it possible to cope with each of a plurality of edge forms to be detected, while neglecting any convexity or concavity corresponding to one pixel attributable to the binary coding error which may be incurred during binary coding performed by the binary coding circuit 16.

Figure 60:
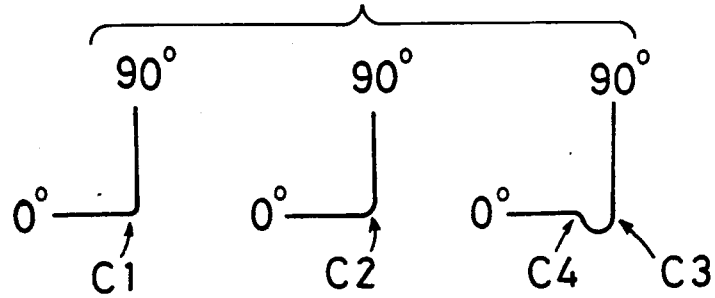
FIG. 60 is an enlarged view of a corner portion of a pattern.

When the templates shown in Tables 1 and 2 are used, an edge angle signal representing 45° is produced at a corner such as C1 (FIG. 60) where an edge of 0° and an edge of 90° intersect each other. With this arrangement, it is possible to prevent any small round corner such as that indicated by C2 from being detected and treated as a defect. A defect such as that indicated by C3, however, is detected because an edge angle signal representing 135° appears in another corner C4.

The 4-bit edge angle signal EI derived from the angle detection circuit 408 and the 4-bit edge angle signal ER derived from the edge angle detection circuit 428 are compared in a comparator circuit 440 which will be detailed later. Thus, the judgement as to whether the real pattern is defective or not is conducted through comparing the edge angles and the positions of the edges represented by the edge angle signals EI and ER.

In some cases, the timing of outputting of the image data may be offset from the timing of the reference data due to various reasons such as a positional deviation of the rear pattern incurred during the production or a movement of the stage 12.

In order to exclude any error which may be caused by offset between both edge angle signals, the output of the angle detection circuit 428 is enlarged by the enlarging circuit 430. The extent or magnification of the enlargement is determined depending on various factors such as the precision of formation of the real pattern and the magnification of the image pick-up device 14. In this embodiment, a tolerance corresponding to ±4 pixels is provided. Thus, four pixels around a core pixel bear the same logical value as the core pixel, so that the reference edge angle data corresponding to one pixel is enlarged to a size corresponding to 9×9 pixels.

Figure 61:
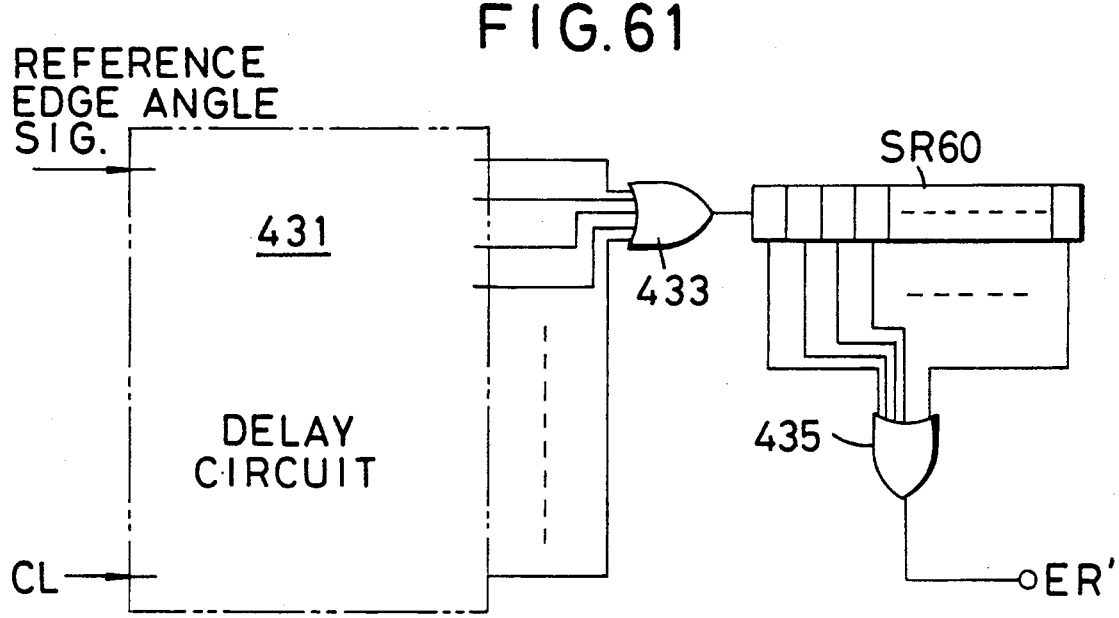
FIG. 61 is a circuit diagram of an enlarging circuit.

FIG. 61 shows a practical example of the enlarging circuit 430. The signal on one bit of the 4-bit edge angle signal ER is input to the delay circuit 431. The delay circuit 431 contains 9 memories and operates in the same manner as the block 402 shown in FIG. 50, so as to produce data which are delayed by amounts corresponding to zero to eight lines from. the input data. These nine data are input to 9 bit serial input-parallel output shift registers SR60 through the logical sum (OR) gate 433. The output of each stage of the shift register is output through a logical sum (OR) circuit 435.

As in the case of the arrangement shown in FIG. 50, the delay circuit 431 is provided with four circuit units each including the logical sum (OR) gate 433, shift register and the logical sum (OR) gate 435, so that 4-bit parallel enlarged reference edge angle data ER1' to ER4' are obtained.

Figure 62:
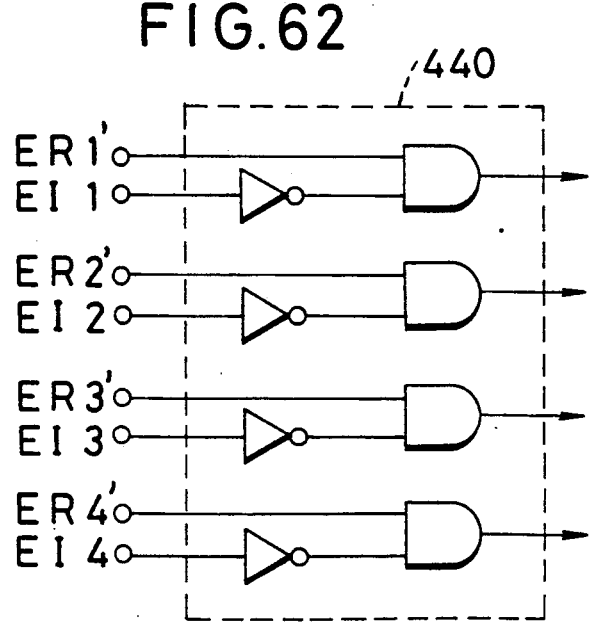
FIG. 62 is a circuit diagram of a comparison circuit.

As will be seen from FIG. 62, the comparator circuit 440 receives, through four logical product (AND) circuits, the ANDs of the parallel 4-bit outputs ER1' to ER4' from the enlarging circuit 430 after inversion of logical values of these data and the parallel 4-bit outputs EI1 to EI4 from the angle detection circuit 408. The AND output in the form of a parallel 4-bit output is delivered as defect data.

In the embodiment described before, the edge angle data EI is compared with the enlarged edge angle data ER. This, however, is not exclusive and the arrangement may be such that the data EI is enlarged and compared with the data ER which has not been enlarged. It is also possible to use both comparison methods.

Figure 63:
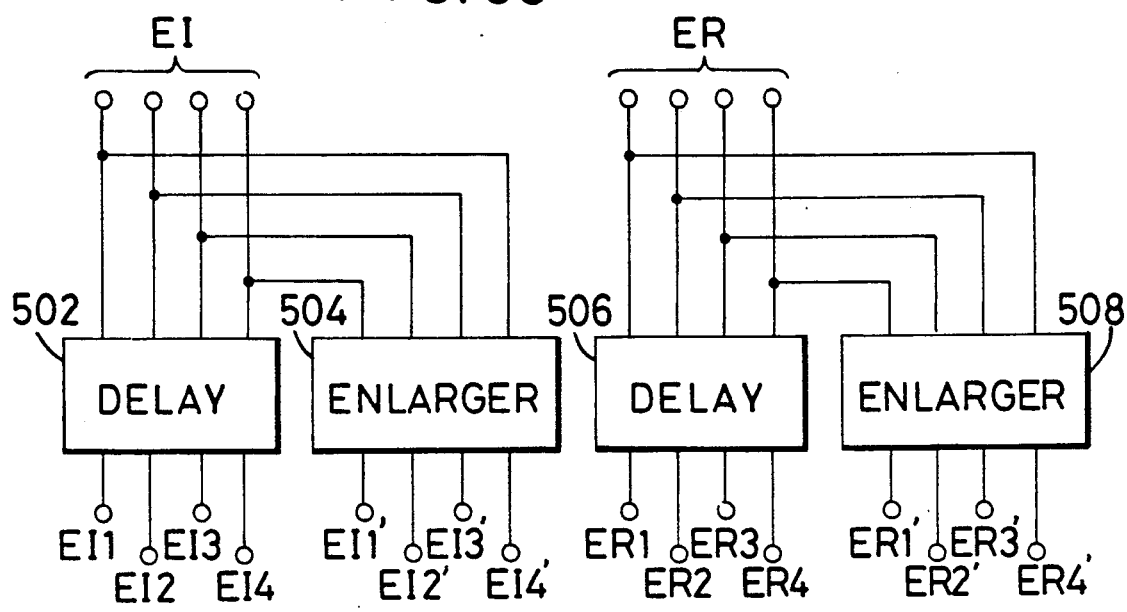
FIG. 63 is a circuit diagram of a modification of the enlarging circuit.
Figure 64:
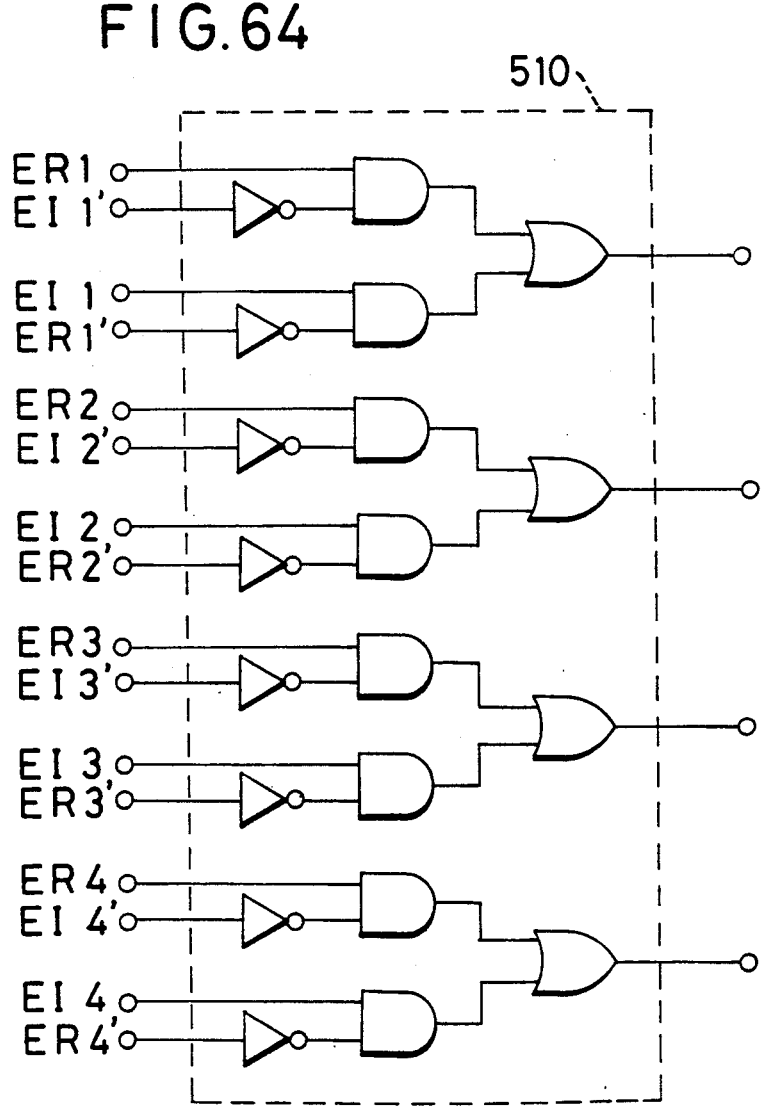
FIG. 64 is a circuit diagram of a modification of the comparison circuit.

When both comparison methods are used, the enlarging circuit shown in FIG. 49 is modified by connecting a circuit shown in FIG. 63 to the outputs of the angle detection circuits 408, 428, while using a circuit as shown in FIG. 64 in place of the comparator circuit 440.

Referring to FIG. 63, the delay circuit 502 and the enlarging circuit 504 receive the parallel 4-bit edge angle data EI from the angle detection circuit 408. Meanwhile, the delay circuit 506 and the enlarging circuit 508 receive the parallel 4-bit edge angle data ER from the angle detection circuit 428.

The delay circuit 502 is adapted to operate so as to attain a synchronism between the edge angle data EI1 to EI4 which have passed therethrough and the enlarged edge angle data ER1' to ER4' output from the enlarging circuit 508. Namely, the delay circuit 502 delays the edge angle data EI such that the central one bit of each of the edge angle data ER1' to ER4' enlarged to 9×9 bits and one bit of each of the edge angle data EI1 to EI4 corresponding to the above-mentioned central one bit are delivered to the comparator circuit in synchronism with each other. On the other hand, the delay circuit 506 is adapted to operate so as to attain a synchronism between the edge angle data ER1 to ER4 which have passed therethrough and the enlarged edge angle data EI1' to EI4' output from the enlarging circuits 504.

Each of the delay circuit 504 and 508 has a circuit arrangement which is the same as that shown in FIG. 61.

Referring now to FIG. 64, the comparator circuit 510 has four circuit units each having two inverters, two AND circuits and an OR circuit. The comparator circuit 510 has 16 (sixteen) inputs which receive the outputs from the circuit shown in FIG. 63. For instance, when edge angle data ER representing 0° is input from the delay circuit 506, the output ER1 has a logical value "1". In this state, if the enlarged edge angle signal EI' representing 0° is not supplied by the enlarging circuit 504, the output E1' takes a logical value "1" so that the AND circuit delivers an output of "1". This in turn causes the OR gate to deliver output "1", thus informing that the real pattern has a defect.

When the fundamental clock for the binary image has a period which is two or more times greater than the writing/reading cycle of the memory, only one memory is enough to constitute the 5×5 bit cut out circuit provided that the memory has a capacity of 512×4 bits.

Figure 65:
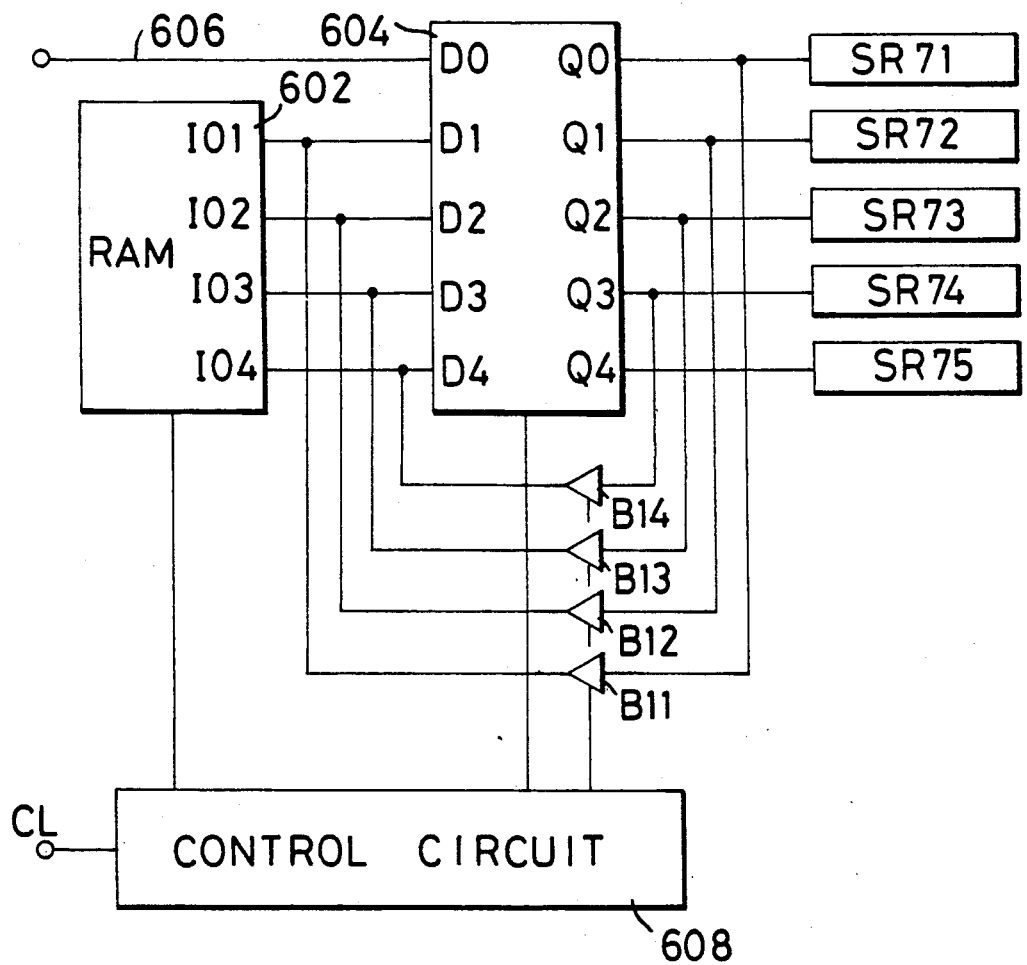
FIG. 65 is a circuit diagram of a modification of the cut-out circuit.

A modification of the cut out circuit for this purpose is shown in FIG. 65. A RAM 602 is a memory having 512×4 bits, with data BUSes IO1 to IO4 connected to the input terminals D1 to D4 of a register 604 together with the input line 606. The output terminals Q0 to Q4 of the register 604 are connected to the input terminals of shift registers SR71 to SR75. Each of these shift registers is a serial input-parallel output shift register, operative to shift the input data in a bit-by-bit manner in synchronism with the input of clocks. The data set in the respective stages of each shift register are output simultaneously in a parallel manner. Each of these shift registers has the same function as the shift registers SR51 to SR55 shown in FIG. 50. The output terminals Q0 to Q3 of the register 604 are connected to the data BUSes IO1 to IO4 of the RAM 602 through threestate buffers B11 to B14.

These circuit elements are controlled by control signals given by a control circuit 608.

It is assumed here that each of the first to fourth bits of each of 512 memory cells of the RAM 602 stores image data which are delayed by amounts corresponding to one to four lines, respectively. The memory cell of a certain address in the RAM 602 is appointed in a timed relation to the supply of the data to the input line 606, and the contents of the memory cell, i.e., the data delayed by one to four lines, are read through the data BUSes IO1 to IO4. The register 604 is adapted to latch the data delayed by one to four lines read through the data BUSes IO1 to IO4, together with the data input to the input line 606, i.e., the data which has not been delayed. Meanwhile, the outputs from the three-state buffers B11 to B14 are held in floating condition. The outputs from the output terminals Q0 to Q4 of the latched register 604 are the data which are delayed by amounts corresponding to zero to four lines.

After the latching, these data are sent to the input terminals of the shift registers SR71 to SR75. At the same time, the three-state buffers B11 to B14 become conductive, so that the data from the output terminals Q0 to Q3 of the register 604 are passed to the data BUSes IO1 to IO4 of the RAM 602. The RAM 602 reads these data in the memory cell of the address from which data has been just read out. This memory cell is accessed again after delay corresponding to one line, i.e., in the 512th cycle of appointment of the address.

Then, as the image data of the next bit is supplied to the input line 606, the memory cell of the next address is appointed in synchronism with the supply of the image data, and the contents of the memory cell, i.e., the data delayed by one to four lines, are read from the memory cell through the data BUSes IO1 to IO4, followed by repetition of the same operation cycle.

We claim:

1. An apparatus for inspecting a pattern formed on an object in accordance with design data, comprising:

image data forming means for picking up an image of said pattern and forming image data from the image;

first cut out means for cutting out first portion data of said image data corresponding to a local region of said pattern;

first template means having a multiplicity of templates prepared for detecting each of plural characteristic portions having a substantially linear form of reference edge forming said pattern and an edge bent from said reference edge, each of said multiplicity of templates being applied to said first portion data to produce a template output;

said first template means including a group of templates each prepared for detecting a plurality of characteristic portions including a characteristic portion at which said reference edge is parallel to a predetermined direction on said pattern, a characteristic portion at which said reference edge slants at 45 degrees with respect to said predetermined direction and a characteristic portion at which said reference edge slants at 90 degrees with respect to said predetermined direction, and a group of templates each prepared for detecting a plurality of characteristic portions including a characteristic portion at which said reference edge slants at an angle between 0 and 45 degrees with respect to said predetermined direction and a characteristic portion at which said reference edge slants at an angle between 45 and 90 degrees with respect to said predetermined direction;

means for sorting said template outputs of said first template means into a plurality of groups corresponding to different ranges of said slant angles of said reference edge and for producing image character data outputs;

means for producing reference data corresponding to said image data based upon said design data;

second cut out means for cutting out second portion data of said reference data corresponding to said local region of said pattern;

second template means having a multiplicity of templates prepared for detecting each of plural characteristic portions having a substantially linear form of reference edge forming said pattern and an edge bent from said reference edge, each of said multiplicity of templates being applied to said second portion data to produce a template output;

said second template means including a group of templates each prepared for detecting a plurality of characteristic portions including a characteristic portion at which said reference edge has a direction the same as a predetermined direction on said pattern, a characteristic portion at which said reference edge slants at 45 degrees with respect to said predetermined direction and a characteristic portion at which said reference edge slants at 90 degrees with respect to said predetermined direction, and a group of templates each prepared for detecting a plurality of characteristic portions including a characteristic portion at which said reference edge slants at an angle between 0 and 45 degrees with respect to said predetermined direction and a characteristic portion at which said reference edge slants at an angle between 45 and 90 degrees with respect to said predetermined direction;

means for sorting said template outputs of said second template means into a plurality of groups corresponding to different ranges of said slant angles of said reference edge and for producing reference character data outputs; and comparing means for comparing said image character data outputs and said reference character data outputs with each other in a predetermined positional relationship thereof and for producing a signal showing any defect on the basis of the difference between said image character data and said reference character data.

2. An apparatus according to claim 1, wherein said different ranges in said image character data output producing means are set narrower than said different ranges in said reference character data output producing means.

3. An apparatus for inspecting a pattern formed on an object in accordance with design data, comprising:

image data forming means for picking up an image of said pattern and forming image data from the image;

first cut out means for cutting out a portion of said image data corresponding to a local region of said pattern;

first edge data generating means for detecting an edge of said pattern from the cut out portion of said image data, for analyzing the detected edge into a plurality of mutually overlapped minute portions and for generating first edge data having plural directions of said minute portions of said edge in a predetermined positional relationship between the detected edge and said first edge data;

reference data generating means for generating reference data corresponding to said image data on the basis of said design data;

second cut out means for cutting out a portion of said reference data corresponding to said local region of said pattern;

second edge data generating means for detecting an edge of said pattern from the cut out portion of said reference data, for analyzing the detected edge into a plurality of mutually overlapped minute portions and for generating second edge data having plural directions of said minute portions of said detected edge in a predetermined positional relationship between the detected edge and said second edge data; and comparing means for comparing said first and second edge data with each other in a predetermined positional relationship thereof and for generating an output showing any defect of said pattern in said local region when one of said first and second edge data does not exist in an allowable area which is defined on the basis of the position and the direction of the edge represented by the other of said first and second edge data.

4. An apparatus according to claim 3, wherein said comparing means includes enlarging means for enlarging one of said first and second edge data while keeping a predetermined positional relationship with respect to the other of said first and second edge data and for comparing the one edge data enlarged by said enlarging means with the other edge data.

5. An apparatus for inspecting a pattern formed on an object in accordance with design data, comprising:

image data forming means for picking up an image of said pattern and forming image data from the image;

reference data forming means for forming reference data corresponding to said image data on the basis of said design data; and detection means for successively comparing said image data and said reference data in a predetermined relation with each other so as to detect a relative difference therebetween and for generating defect data;

said detection means including means for prohibiting the comparison between said image data and said reference data in a comparison prohibiting area which is defined on the basis of at least one of an edge of said pattern in said image data and an edge of said pattern in said reference data, and detecting said defect which exists outside said comparison prohibiting area, and said detection means comprising first output generating means for comparing an observed pixel of said image data with a pixel of said reference data corresponding too said observed pixel and generating a first output when said pixels do not coincide with each other;

second output generating means for monitoring said image data and generating a second output when an edge of said pattern does not exist in a predetermined region around said observed pixel which is centered in said predetermined region;

third output generating means for monitoring said reference data and generating a third output when an edge of said pattern does not exist in a predetermined region around said pixel corresponding to said observed pixel which is centered in that predetermined region;

first AND gate means for receiving said first and second outputs and for generating an output when both said first and second outputs are received;

second AND gate means for receiving said first and third outputs and for generating an output when both said first and third outputs are received; and OR gate means for generating said defect data when at least one of said first and second AND gate means generates an output.

6. An apparatus according to claim 5, wherein said detection means includes means for determining the size of a defect in said pattern represented by said defect data.

7. An apparatus according to claim 6, wherein said size determining means includes a plurality of means for measuring the length of said defect in said pattern represented by said defect data in a plurality of directions on said pattern.

8. An apparatus according to claim 7, wherein said size determining means includes selection means for comparing the plurality of measured lengths and for selecting the greatest length among the measured lengths to generate an output representing the size of said defect.

9. An apparatus according to claim 8, wherein said selection means includes means for detecting a pattern edge on said pattern in the vicinity of said reference data at a position corresponding too said defect represented by said defect data and for determining the direction of the pattern edge, and means for omitting, from the comparison, a length measured in a direction parallel to said direction of said pattern edge.

* * * * *